US010046764B2

(12) United States Patent
Masuda et al.

(10) Patent No.: US 10,046,764 B2
(45) Date of Patent: Aug. 14, 2018

(54) VEHICLE CONTROL SYSTEM

(71) Applicant: TOYOTA JIDOSHA KABUSHIKI KAISHA, Toyota-shi, Aichi-ken (JP)

(72) Inventors: Takato Masuda, Toyota (JP); Takashi Inoue, Kasugai (JP); Tetsuya Taira, Nisshin (JP); Keiji Yamashita, Seto (JP); Nobuyuki Tomatsu, Toyota (JP); Sokfan Yee, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/269,337

(22) Filed: Sep. 19, 2016

(65) Prior Publication Data
US 2017/0106864 A1    Apr. 20, 2017

(30) Foreign Application Priority Data
Oct. 19, 2015  (JP) .................................. 2015-205844

(51) Int. Cl.
*B60W 30/14* (2006.01)
*B60R 11/04* (2006.01)
(Continued)

(52) U.S. Cl.
CPC ........... *B60W 30/146* (2013.01); *B60R 11/04* (2013.01); *G06K 9/00791* (2013.01);
(Continued)

(58) Field of Classification Search
CPC . B60W 30/146; B60W 2720/10; B60R 11/04; G06K 9/00791; G06K 9/00818; G06T 11/60
(Continued)

(56) References Cited

U.S. PATENT DOCUMENTS 7,042,347 B2 * 5/2006 Cherouny ............ B60K 28/063
340/438
8,731,770 B2 * 5/2014 Fischer .................. G01C 21/26
701/29.1
(Continued)

FOREIGN PATENT DOCUMENTS

JP    2005-128790 A    5/2005
JP    2008-298547 A    12/2008
(Continued)

*Primary Examiner* — Krishnan Ramesh
(74) *Attorney, Agent, or Firm* — Oliff PLC

(57) ABSTRACT

A vehicle control system includes a limiter device, and a setting device to set an upper speed limit on the limiter device, based on speed limit values extracted from image information. The setting device includes a derivation unit to derive a condition to raise display priority for each speed limit value; an obtainment unit to obtain determination information for determining whether the condition is satisfied; a calculation unit to raise the display priority of the speed limit value that corresponds to the condition determined satisfied with the determination information, among the speed limit values extracted from the image information; a display control unit to display the speed limit values in descending order of the display priority; and a setting unit configured to set the upper speed limit on the limiter device, based on one of the displayed speed limit values, selected by an occupant of the vehicle.

4 Claims, 29 Drawing Sheets

(51) Int. Cl.
 *G06K 9/00* (2006.01)
 *G06T 11/60* (2006.01)
(52) U.S. Cl.
 CPC ..... *G06K 9/00818* (2013.01); *B60W 2720/10* (2013.01); *G06T 11/60* (2013.01)
(58) Field of Classification Search
 USPC .......................................................... 701/98
 See application file for complete search history.

(56) References Cited

U.S. PATENT DOCUMENTS

| | | | |
|---|---|---|---|
| 9,539,901 B1* | 1/2017 | Clauss | B60K 31/18 |
| 2002/0152987 A1* | 10/2002 | Woolford | F02D 31/009 |
| | | | 123/333 |
| 2006/0052909 A1* | 3/2006 | Cherouny | B60K 28/063 |
| | | | 701/1 |
| 2007/0067086 A1* | 3/2007 | Rothschild | B60K 31/185 |
| | | | 701/93 |
| 2007/0156321 A1* | 7/2007 | Schad | B60K 31/00 |
| | | | 701/96 |
| 2010/0282209 A1* | 11/2010 | Gray | B60K 31/047 |
| | | | 123/350 |
| 2011/0054767 A1* | 3/2011 | Schafer | G08G 1/0104 |
| | | | 701/119 |
| 2012/0253628 A1 | 10/2012 | Maruyama | |
| 2013/0085655 A1* | 4/2013 | Kii | B60K 31/18 |
| | | | 701/103 |
| 2017/0203769 A1* | 7/2017 | Ohta | B60W 50/12 |

FOREIGN PATENT DOCUMENTS

| | | |
|---|---|---|
| JP | 2012-206594 A | 10/2012 |
| JP | 2012-248111 A | 12/2012 |

\* cited by examiner

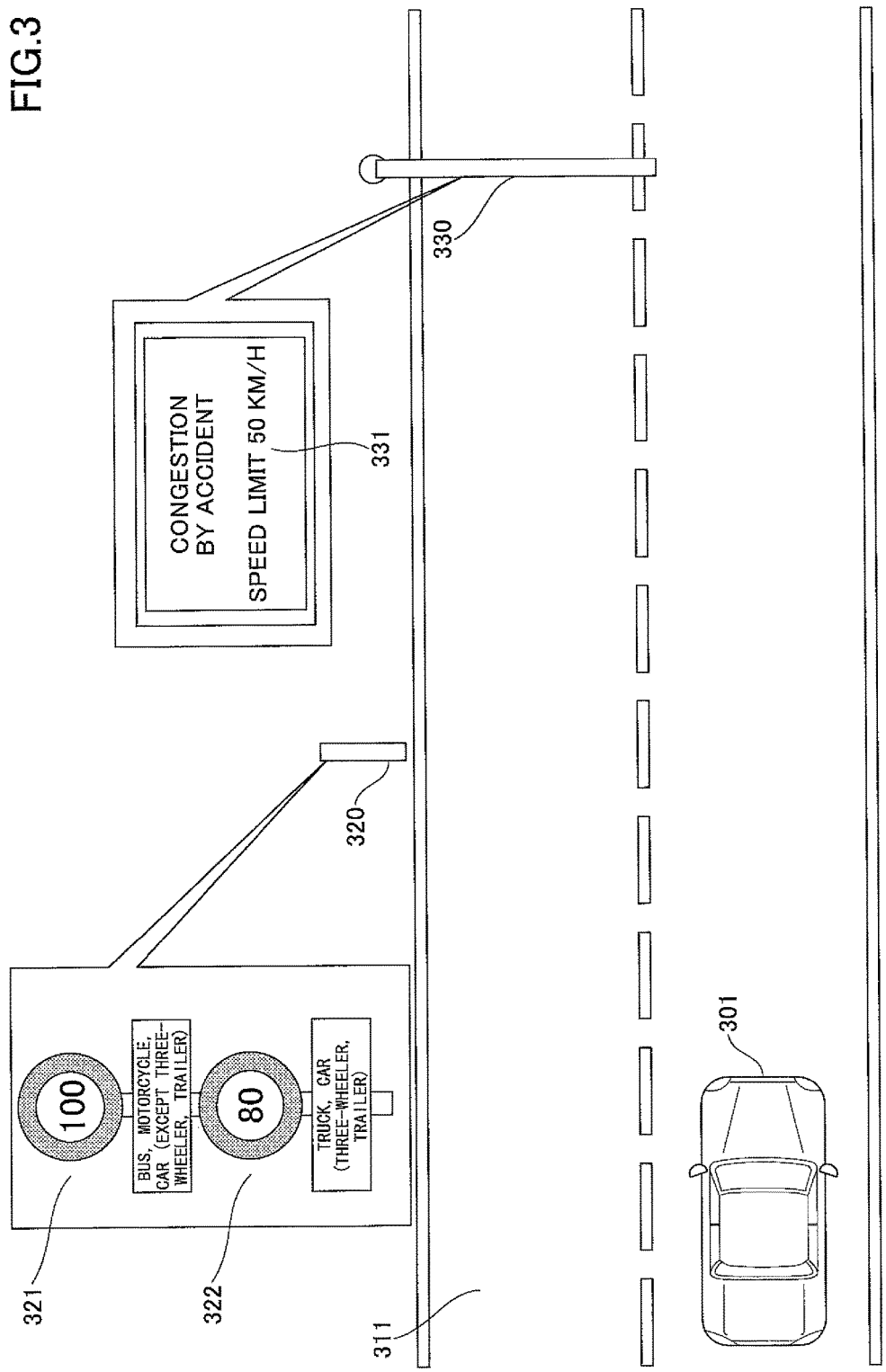

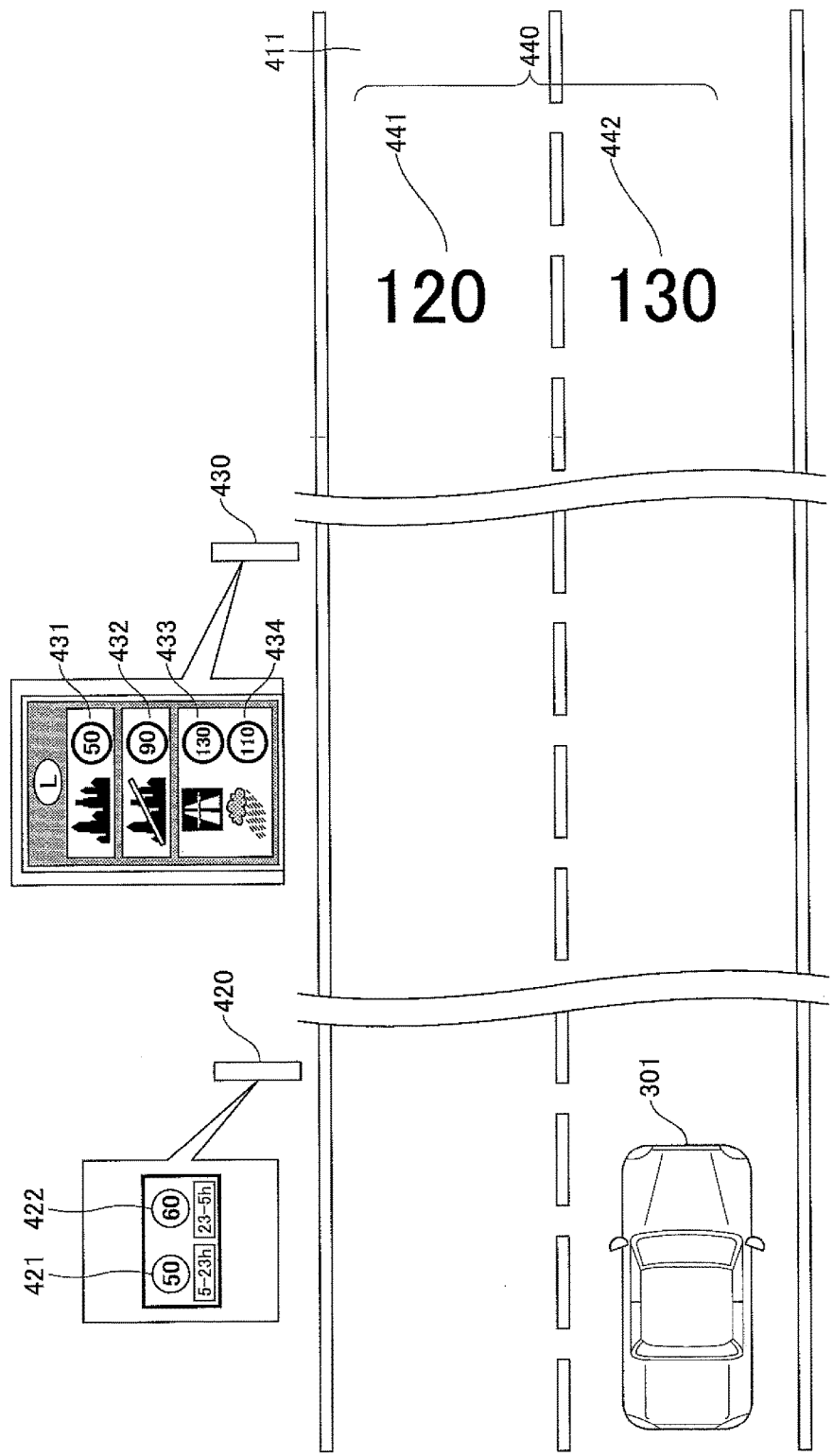

FIG.5

| CONDITION INFORMATION | CONDITION DERIVED FROM CONDITION INFORMATION | DETERMINATION INFORMATION FOR DETERMINING WHETHER CONDITION IS SATISFIED | INFORMATION FOR OBTAINING DETERMINATION INFORMATION |
|---|---|---|---|
| BUS, MOTORCYCLE, CAR (EXCEPT THREE-WHEELER, TRAILER) | TYPE OF VEHICLE BEING BUS, MOTORCYCLE, OR CAR (EXCEPT FOR THREE-WHEELER AND TRAILER) | TYPE OF VEHICLE | VEHICLE TYPE INFORMATION |
|  | TYPE OF DRIVING ROAD BEING MOTORWAY | TYPE OF ROAD ON WHICH VEHICLE IS TRAVELING | NAVIGATION INFORMATION |
| 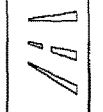 | DRIVING LANE BEING LANE ON THE LEFT | LANE ON WHICH VEHICLE IS TRAVELING | IMAGE INFORMATION |
| 5-23h | TRAVELING HOURS BETWEEN 5:00 AND 23:00 | CURRENT TIME | TIME INFORMATION |
|  | WEATHER BEING RAINY CONDITION | WEATHER AROUND VEHICLE | NAVIGATION INFORMATION PLUS NETWORK COMMUNICATION INFORMATION, SENSOR INFORMATION, IMAGE INFORMATION |
|  | DISTANCE FROM CURRENT POSITION OF VEHICLE TO STARTING POSITION AT WHICH SPEED LIMIT IS APPLIED, BEING PREDETERMINED THRESHOLD OR SHORTER | DISTANCE FROM CURRENT POSITION OF VEHICLE TO STARTING POSITION AT WHICH SPEED LIMIT IS APPLIED | NAVIGATION INFORMATION |
| SPEED LIMIT DEFINED BY ADDITIONAL PRIORITY INFORMATION | CURRENT PEDALING-BASED VEHICLE SPEED BEING TO RAISE DISPLAY PRIORITY OF SPEED LIMIT | PEDALING-BASED VEHICLE SPEED | CO-ECU INFORMATION |

FIG.9A

| TIME INFORMATION ABOUT CAPTURED IMAGE | POSITIONAL INFORMATION ABOUT CAPTURED IMAGE | TYPE OF SIGNAGE | IMAGE AREA OF SPEED LIMIT | SPEED LIMIT | CONDITION INFORMATION | CONDITION |
|---|---|---|---|---|---|---|
| JUNE 10, 14:32 | LAT. P° PP' PPP"N AND LONG. Q° QQ' QQQ"E | ROAD SIGN | (100) | 100 KM/H | BUS, MOTORCYCLE, CAR (EXCEPT THREE-WHEELER, TRAILER) | * TYPE OF VEHICLE BEING BUS, MOTORCYCLE, OR CAR (EXCEPT FOR THREE-WHEELER AND TRAILER) * DISTANCE FROM CURRENT POSITION OF VEHICLE TO STARTING POSITION AT WHICH SPEED LIMIT IS APPLIED (POSITION OF SIGN), BEING PREDETERMINED THRESHOLD OR SHORTER |
| | | | (80) | 80 KM/H | TRUCK, CAR (THREE-WHEELER, TRAILER) | * TYPE OF VEHICLE BEING TRUCK, THREE-WHEELER CAR, OR TRAILER CAR * DISTANCE FROM CURRENT POSITION OF VEHICLE TO STARTING POSITION AT WHICH SPEED LIMIT IS APPLIED (POSITION OF SIGN), BEING PREDETERMINED THRESHOLD OR SHORTER |
| JUNE 10, 14:33 | LAT. P° PP' PPP"N AND LONG. Q° QQ' QQQ"E | ELECTRIC BULLETIN BOARD | 50 [km/h] | 50 KM/H | SPEED LIMIT DEFINED BY ADDITIONAL PRIORITY INFORMATION (50 KM/H) | * DISTANCE FROM CURRENT POSITION OF VEHICLE TO STARTING POSITION AT WHICH SPEED LIMIT IS APPLIED (POSITION OF ELECTRIC BULLETIN BOARD), BEING PREDETERMINED THRESHOLD OR SHORTER * PEDALING-BASED VEHICLE SPEED BEING TO RAISE PRIORITY OF SPEED LIMIT (50 KM/H) |

| TIME INFORMATION ABOUT CAPTURED IMAGE | POSITIONAL INFORMATION ABOUT CAPTURED IMAGE | TYPE OF SIGNAGE | IMAGE AREA OF SPEED LIMIT | SPEED LIMIT | CONDITION INFORMATION | CONDITION |
|---|---|---|---|---|---|---|
| JULY 12, 11:43 | LAT. L° LL' LLL"N AND LONG. N° NN' NNN"E | ROAD SIGN | 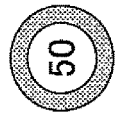 | 50 KM/H | 5-23h<br>SPEED LIMIT DEFINED BY ADDITIONAL PRIORITY INFORMATION (50 KM/H) | * TRAVELING HOURS BETWEEN 5:00 AND 23:00<br>* DISTANCE FROM CURRENT POSITION OF VEHICLE TO STARTING POSITION AT WHICH SPEED LIMIT IS APPLIED (POSITION OF SIGN), BEING PREDETERMINED THRESHOLD OR SHORTER<br>* PEDALING-BASED VEHICLE SPEED BEING TO RAISE PRIORITY OF SPEED LIMIT (50 KM/H) |
| | | | 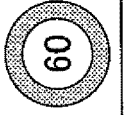 | 60 KM/H | 23-5h | * TRAVELING HOURS BETWEEN 23:00 AND 5:00<br>* DISTANCE FROM CURRENT POSITION OF VEHICLE TO STARTING POSITION AT WHICH SPEED LIMIT IS APPLIED (POSITION OF SIGN), BEING PREDETERMINED THRESHOLD OR SHORTER |

| TIME INFORMATION ABOUT CAPTURED IMAGE | POSITIONAL INFORMATION ABOUT CAPTURED IMAGE | TYPE OF SIGNAGE | IMAGE AREA OF SPEED LIMIT | SPEED LIMIT | CONDITION INFORMATION | CONDITION |
|---|---|---|---|---|---|---|
| JULY 14, 12:50 | LAT. L° LL' LLL"N AND LONG. N° NN' NNN"E | ROAD SIGN | (50) | 50 KM/H | SPEED LIMIT DEFINED BY ADDITIONAL PRIORITY INFORMATION (50 KM/H) | * TYPE OF DRIVING ROAD BEING TOWN ROAD<br>* DISTANCE FROM CURRENT POSITION OF VEHICLE TO STARTING POSITION AT WHICH SPEED LIMIT IS APPLIED (TOWN), BEING PREDETERMINED THRESHOLD OR SHORTER<br>* PEDALING-BASED VEHICLE SPEED BEING TO RAISE PRIORITY OF SPEED LIMIT (50 KM/H) |
| | | | (90) | 90 KM/H | SPEED LIMIT DEFINED BY ADDITIONAL PRIORITY INFORMATION (90 KM/H) | * TYPE OF DRIVING ROAD BEING SUBURBAN ROAD<br>* DISTANCE FROM CURRENT POSITION OF VEHICLE TO STARTING POSITION AT WHICH SPEED LIMIT IS APPLIED (SUBURB), BEING PREDETERMINED THRESHOLD OR SHORTER<br>* PEDALING-BASED VEHICLE SPEED BEING TO RAISE PRIORITY OF SPEED LIMIT (90 KM/H) |
| | | | (130) | 130 KM/H | SPEED LIMIT DEFINED BY ADDITIONAL PRIORITY INFORMATION (130 KM/H) | * TYPE OF DRIVING ROAD BEING EXPRESSWAY<br>* DISTANCE FROM CURRENT POSITION OF VEHICLE TO STARTING POSITION AT WHICH SPEED LIMIT IS APPLIED (EXPRESSWAY), BEING PREDETERMINED THRESHOLD OR SHORTER<br>* PEDALING-BASED VEHICLE SPEED BEING TO RAISE PRIORITY OF SPEED LIMIT (130 KM/H) |
| | | | (110) | 110 KM/H | | * TYPE OF DRIVING ROAD BEING EXPRESSWAY<br>* WEATHER BEING RAINY CONDITION<br>* DISTANCE FROM CURRENT POSITION OF VEHICLE TO STARTING POSITION AT WHICH SPEED LIMIT IS APPLIED (EXPRESSWAY), BEING PREDETERMINED THRESHOLD OR SHORTER |

| TIME INFORMATION ABOUT CAPTURED IMAGE | POSITIONAL INFORMATION ABOUT CAPTURED IMAGE | TYPE OF SIGNAGE | IMAGE AREA OF SPEED LIMIT | SPEED LIMIT | CONDITION INFORMATION | CONDITION |
|---|---|---|---|---|---|---|
| JULY 15, 8:20 | LAT. L° LL' LLL"N AND LONG. N° NN' NNN"E | ROAD MARKING | 120 | 120 KM/H |  | * DRIVING LANE BEING LANE ON THE LEFT<br>** DISTANCE FROM CURRENT POSITION OF VEHICLE TO STARTING POSITION AT WHICH SPEED LIMIT IS APPLIED (POSITION OF MARKING), BEING PREDETERMINED THRESHOLD OR SHORTER |
|  |  |  | 130 | 130 KM/H | SPEED LIMIT DEFINED BY ADDITIONAL PRIORITY INFORMATION (130 KM/H) | * DRIVING LANE BEING LANE ON THE RIGHT<br>** DISTANCE FROM CURRENT POSITION OF VEHICLE TO STARTING POSITION AT WHICH SPEED LIMIT IS APPLIED (POSITION OF MARKING), BEING PREDETERMINED THRESHOLD OR SHORTER<br>* PEDALING-BASED VEHICLE SPEED BEING TO RAISE PRIORITY OF SPEED LIMIT (130 KM/H) |

| TIME INFORMATION ABOUT CAPTURED IMAGE | POSITIONAL INFORMATION ABOUT CAPTURED IMAGE | TYPE OF SIGNAGE | IMAGE AREA OF SPEED LIMIT | SPEED LIMIT | CONDITION INFORMATION | CONDITION | DISPLAY PRIORITY |
|---|---|---|---|---|---|---|---|
| JUNE 10, 14:32 | LAT. P° PP' PPP"N AND LONG. Q° QQ' QQQ"E | ROAD SIGN | (100) | 100 KM/H | BUS, MOTORCYCLE, CAR (EXCEPT THREE-WHEELER, TRAILER) | * TYPE OF VEHICLE BEING BUS, MOTORCYCLE, OR CAR (EXCEPT FOR THREE-WHEELER AND TRAILER) * DISTANCE FROM CURRENT POSITION OF VEHICLE TO STARTING POSITION AT WHICH SPEED LIMIT IS APPLIED (POSITION OF SIGN), BEING PREDETERMINED THRESHOLD OR SHORTER | 2 |
| | | | (80) | 80 KM/H | TRUCK, CAR (THREE-WHEELER, TRAILER) | * TYPE OF VEHICLE BEING TRUCK, THREE-WHEELER CAR, OR TRAILER CAR * DISTANCE FROM CURRENT POSITION OF VEHICLE TO STARTING POSITION AT WHICH SPEED LIMIT IS APPLIED (POSITION OF SIGN), BEING PREDETERMINED THRESHOLD OR SHORTER | 1 |
| JUNE 10, 14:33 | LAT. P° PP' PPP"N AND LONG. Q° QQ' QQQ"E | ELECTRIC BULLETIN BOARD | 50 [km/h] | 50 KM/H | SPEED LIMIT DEFINED BY ADDITIONAL PRIORITY INFORMATION (50 KM/H) | * DISTANCE FROM CURRENT POSITION OF VEHICLE TO STARTING POSITION AT WHICH SPEED LIMIT IS APPLIED (POSITION OF ELECTRIC BULLETIN BOARD), BEING PREDETERMINED THRESHOLD OR SHORTER * PEDALING-BASED VEHICLE SPEED BEING TO RAISE PRIORITY OF SPEED LIMIT (50 KM/H) | 2 |

| TIME INFORMATION ABOUT CAPTURED IMAGE | POSITIONAL INFORMATION ABOUT CAPTURED IMAGE | TYPE OF SIGNAGE | IMAGE AREA OF SPEED LIMIT | SPEED LIMIT | CONDITION INFORMATION | | CONDITION | DISPLAY PRIORITY |
|---|---|---|---|---|---|---|---|---|
| JULY 12, 11:43 | LAT. L° LL' LLL"N AND LONG. N° NN' NNN"E | ROAD SIGN | (50) | 50 KM/H | 5-23h | SPEED LIMIT DEFINED BY ADDITIONAL PRIORITY INFORMATION (50 KM/H) | * TRAVELING HOURS BETWEEN 5:00 AND 23:00<br>** DISTANCE FROM CURRENT POSITION OF VEHICLE TO STARTING POSITION AT WHICH SPEED LIMIT IS APPLIED (POSITION OF SIGN), BEING PREDETERMINED THRESHOLD OR SHORTER<br>* PEDALING-BASED VEHICLE SPEED BEING TO RAISE PRIORITY OF SPEED LIMIT (50 KM/H) | 3 |
| | | | (60) | 60 KM/H | 23-5h | | * TRAVELING HOURS BETWEEN 23:00 AND 5:00<br>** DISTANCE FROM CURRENT POSITION OF VEHICLE TO STARTING POSITION AT WHICH SPEED LIMIT IS APPLIED (POSITION OF SIGN), BEING PREDETERMINED THRESHOLD OR SHORTER | 1 |

| TIME INFORMATION ABOUT CAPTURED IMAGE | POSITIONAL INFORMATION ABOUT CAPTURED IMAGE | TYPE OF SIGNAGE | IMAGE AREA OF SPEED LIMIT | SPEED LIMIT | CONDITION INFORMATION | CONDITION | DISPLAY PRIORITY |
|---|---|---|---|---|---|---|---|
| JULY 14, 12:50 | LAT. L° LL' LLL"N AND LONG. N° NN' NNN"E | ROAD SIGN | 50 | 50 KM/H | SPEED LIMIT DEFINED BY ADDITIONAL PRIORITY INFORMATION (50 KM/H) | * TYPE OF DRIVING ROAD BEING TOWN ROAD<br>** DISTANCE FROM CURRENT POSITION OF VEHICLE TO STARTING POSITION AT WHICH SPEED LIMIT IS APPLIED (TOWN), BEING PREDETERMINED THRESHOLD OR SHORTER<br>* PEDALING-BASED VEHICLE SPEED BEING TO RAISE PRIORITY OF SPEED LIMIT (50 KM/H) | 1 |
| | | | 90 | 90 KM/H | SPEED LIMIT DEFINED BY ADDITIONAL PRIORITY INFORMATION (90 KM/H) | * TYPE OF DRIVING ROAD BEING SUBURBAN ROAD<br>** DISTANCE FROM CURRENT POSITION OF VEHICLE TO STARTING POSITION AT WHICH SPEED LIMIT IS APPLIED (SUBURB), BEING PREDETERMINED THRESHOLD OR SHORTER<br>* PEDALING-BASED VEHICLE SPEED BEING TO RAISE PRIORITY OF SPEED LIMIT (90 KM/H) | 2 |
| | | | 130 | 130 KM/H | SPEED LIMIT DEFINED BY ADDITIONAL PRIORITY INFORMATION (130 KM/H) | * TYPE OF DRIVING ROAD BEING EXPRESSWAY<br>** DISTANCE FROM CURRENT POSITION OF VEHICLE TO STARTING POSITION AT WHICH SPEED LIMIT IS APPLIED (EXPRESSWAY), BEING PREDETERMINED THRESHOLD OR SHORTER<br>* PEDALING-BASED VEHICLE SPEED BEING TO RAISE PRIORITY OF SPEED LIMIT (130 KM/H) | 0 |
| | | | 110 | 110 KM/H | | * TYPE OF DRIVING ROAD BEING EXPRESSWAY<br>** WEATHER BEING RAINY CONDITION<br>** DISTANCE FROM CURRENT POSITION OF VEHICLE TO STARTING POSITION AT WHICH SPEED LIMIT IS APPLIED (EXPRESSWAY), BEING PREDETERMINED THRESHOLD OR SHORTER | 0 |

| TIME INFORMATION ABOUT CAPTURED IMAGE | POSITIONAL INFORMATION ABOUT CAPTURED IMAGE | TYPE OF SIGNAGE | IMAGE AREA OF SPEED LIMIT | SPEED LIMIT | CONDITION INFORMATION | CONDITION | DISPLAY PRIORITY |
|---|---|---|---|---|---|---|---|
| JULY 15, 8:20 | LAT. L° LL' LLL"N AND LONG. N° NN' NNN"E | ROAD MARKING | 120 | 120 KM/H | | * DRIVING LANE BEING LANE ON THE LEFT<br>** DISTANCE FROM CURRENT POSITION OF VEHICLE TO STARTING POSITION AT WHICH SPEED LIMIT IS APPLIED (POSITION OF MARKING), BEING PREDETERMINED THRESHOLD OR SHORTER | 1 |
| | | | 130 | 130 KM/H | SPEED LIMIT DEFINED BY ADDITIONAL PRIORITY INFORMATION (130 KM/H) | * DRIVING LANE BEING LANE ON THE RIGHT<br>** DISTANCE FROM CURRENT POSITION OF VEHICLE TO STARTING POSITION AT WHICH SPEED LIMIT IS APPLIED (POSITION OF MARKING), BEING PREDETERMINED THRESHOLD OR SHORTER<br>* PEDALING-BASED VEHICLE SPEED BEING TO RAISE PRIORITY OF SPEED LIMIT (130 KM/H) | 3 |

1520

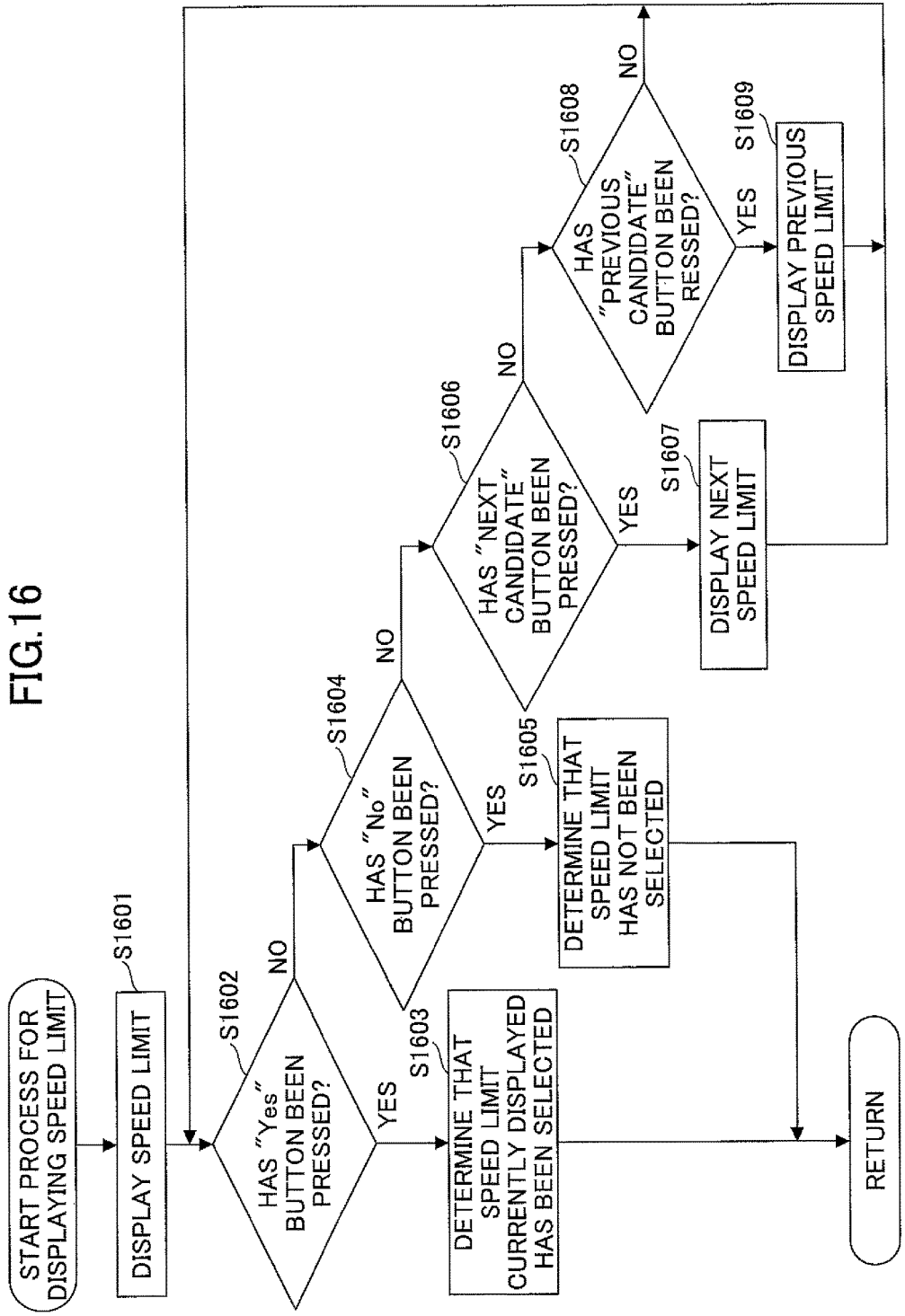

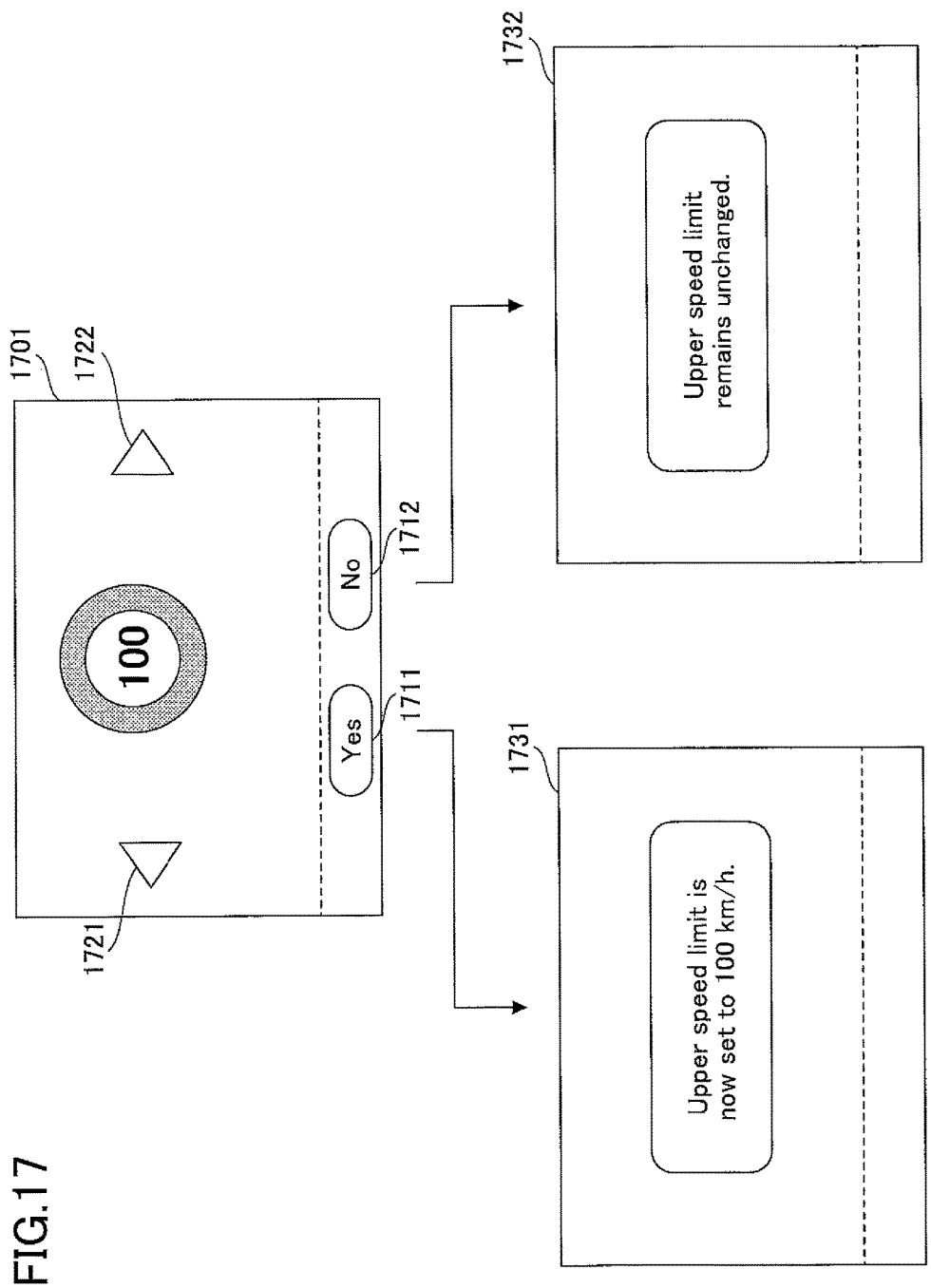

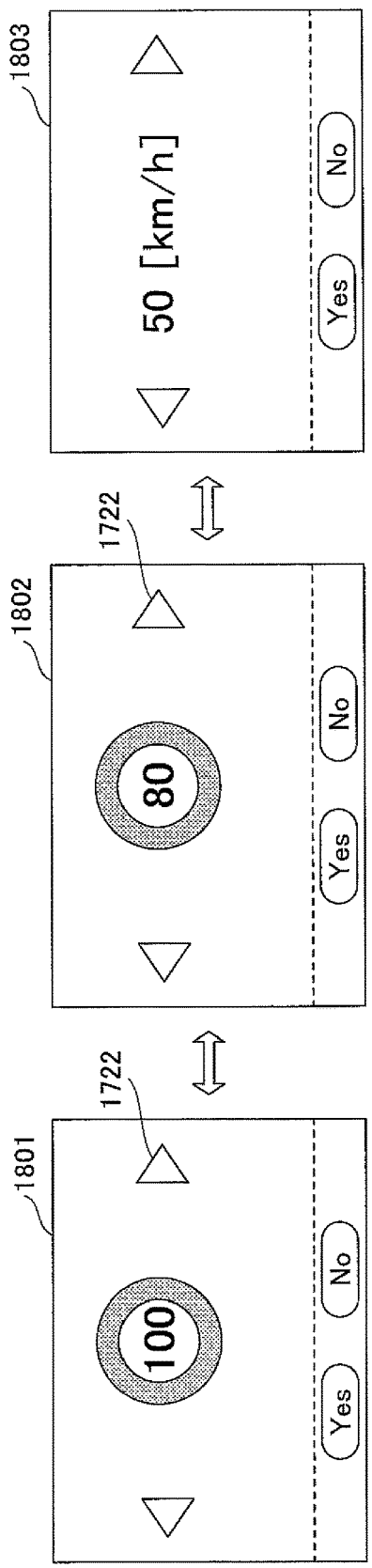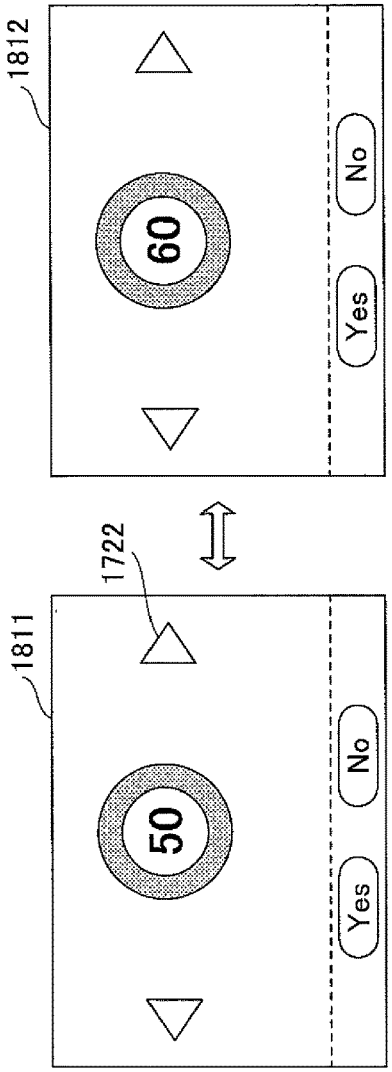
FIG.18A
FIG.18B

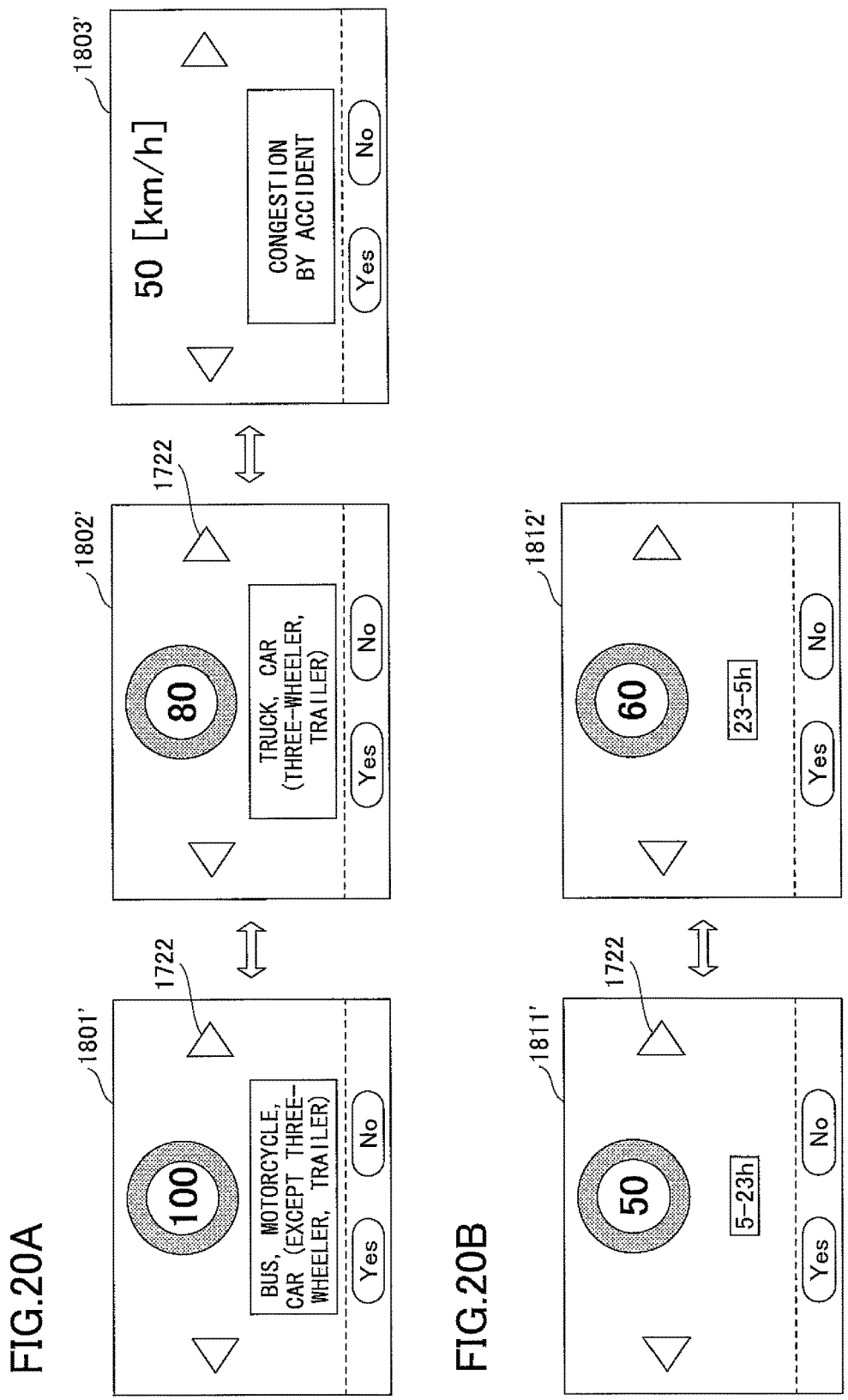

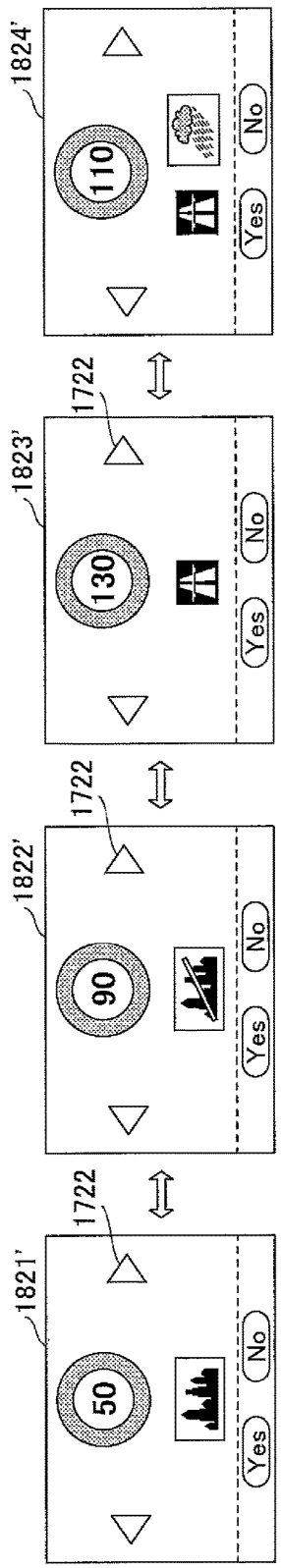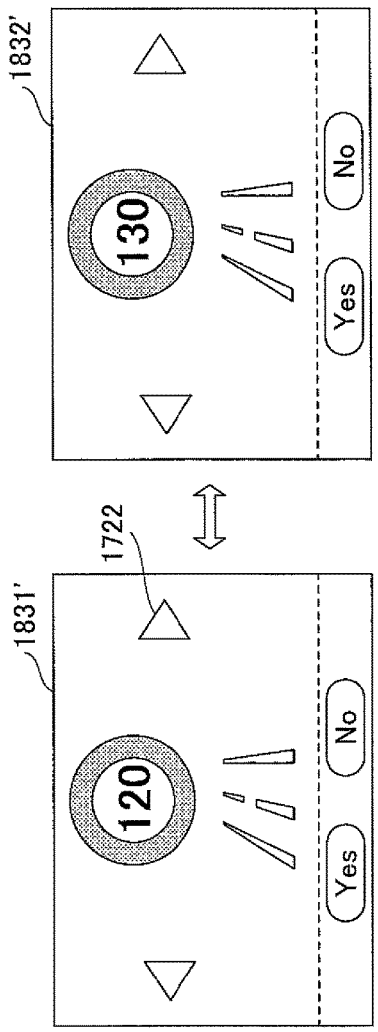

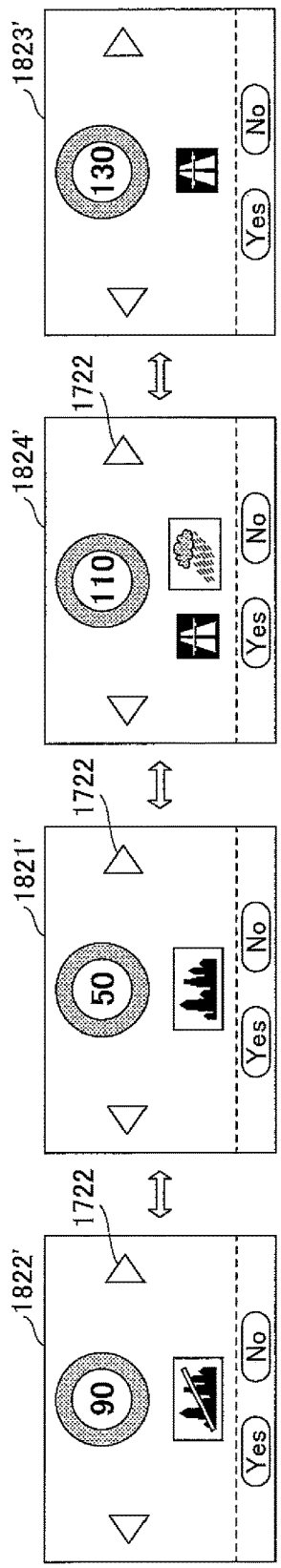
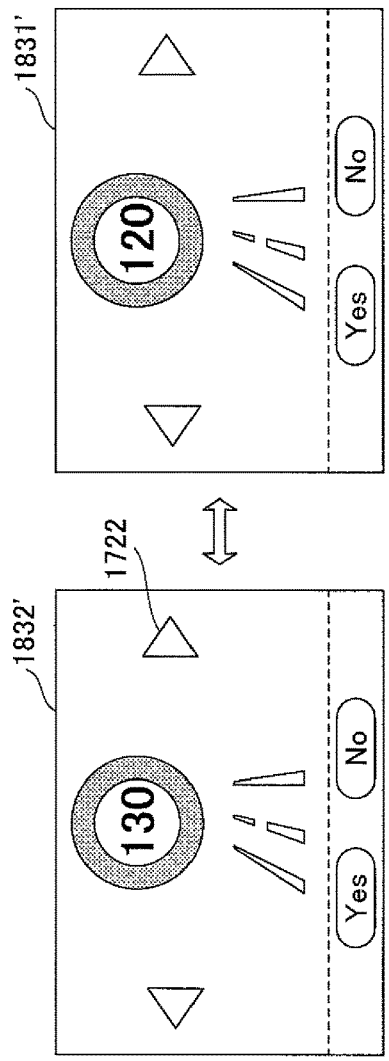
FIG.21C
FIG.21D

VEHICLE CONTROL SYSTEM

FIELD

The present disclosure relates to a vehicle control system.

BACKGROUND

Conventionally, a vehicle control system has been known that images road signs, road markings, electric bulletin boards, and the like by using an imaging device installed on a vehicle, extracts speed limit values based on image information obtained by the imaging, and sets an upper speed limit to limit the speed of the vehicle. According to such a vehicle control system, it is possible to limit the speed of the vehicle by setting an upper speed limit based on the speed limit value specified for a road on which the vehicle is traveling.

RELATED-ART DOCUMENTS

Patent Documents

[Patent Document 1] Japanese Laid-open Patent Publication No. 2012-248111
[Patent Document 2] Japanese Laid-open Patent Publication No. 2008-298547

On the other hand, it is often the case that a road sign, a road marking, an electric bulletin board, or the like may have multiple speed limit values displayed considering various traveling conditions. Specifically, these signs may have multiple speed limit values displayed depending on differences about types of vehicles (ordinary car, motorcycle, etc.), types of roads (ordinary road, expressway, etc.), driving lanes (on the left, on the right, etc.), traveling hours, weather (rain dropping, snow falling, etc.), and the like.

In general, if multiple speed limit values are displayed, the multiple speed limit values are extracted from the image information. In such a case, a conventional vehicle control system cannot determine an upper speed limit to be set on the vehicle, and an occupant of the vehicle may need to input the upper speed limit manually. Alternatively, an upper speed limit different from the upper speed limit to be set may be automatically set by the vehicle control system.

To cope with such problems, one may consider a system configured, for example, to display multiple speed limit values extracted based on image information that are sequentially switched to be reviewed by an occupant of the vehicle, and to have the occupant of the vehicle select one of the displayed speed limit values as the upper speed limit. Configured in this way, the occupant of the vehicle just needs to select a displayed speed limit value for setting the upper speed limit, and can save time and trouble of inputting the speed limit value manually. Also, the upper speed limit can be set on the vehicle without error.

However, if the number of speed limit values extracted based on image information becomes greater, such a configuration introduces inconvenience for the occupant of the vehicle because multiple display switching operations may be required to display the speed limit value to be selected, and as such, the number of required operations increases.

Thereupon, it is an object of an embodiment in the present disclosure to provide a vehicle control system that is configured to make it easier for an occupant of a vehicle to select a speed limit value among multiple speed limit values extracted based on image information, for setting the upper speed limit on the vehicle.

SUMMARY

According to an aspect of the present disclosure, a vehicle control system includes an imaging device; a limiter device configured to limit speed of the vehicle; a setting device configured to extract one or more speed limit values, based on image information captured by the imaging device, and to set an upper speed limit on the limiter device; and a display device configured to display the speed limit values extracted by the setting device. The setting device includes a derivation unit configured to derive a condition for raising display priority for each of the speed limit values, based on the image information; an obtainment unit configured to obtain determination information for determining whether the condition derived by the derivation unit is satisfied; a determination unit configured to determine whether the determination information satisfies the condition corresponding to each of the speed limit values; a calculation unit configured to calculate the display priority for each of the speed limit values, by raising the display priority of the speed limit value that corresponds to the condition determined satisfied with the determination information by the determination unit; a display control unit configured to display the speed limit values on the display device in descending order of the display priority calculated by the calculation unit; a reception unit configured to receive selection of one speed limit value among the speed limit values displayed in descending order of the display priority, by an occupant of the vehicle; and a setting unit configured to set the upper speed limit on the limiter device, based on the one speed limit value received by the reception unit as the selection.

In the vehicle control system, the derivation unit derives a condition to raise the display priority of the speed limit value based on the image information, and the obtainment unit obtains the determination information for determining whether the condition is satisfied. Then, if it is determined that the obtained determination information satisfies the derived condition, the calculation unit raises the display priority of the speed limit value that corresponds to the condition, and the display control unit displays the speed limit values in descending order of the display priority.

Thus, the speed limit value having a higher display priority is prioritized in the display sequence, and hence, the occupant of the vehicle can select the speed limit value having a higher display priority with a few operations.

According to the disclosure, it is possible to provide a vehicle control system that is configured to make it easier for an occupant of a vehicle to select a speed limit value among multiple speed limit values extracted based on image information, for setting the upper speed limit on the vehicle.

BRIEF DESCRIPTION OF DRAWINGS

FIG. 3 is a diagram illustrating an example of a road sign and an electric bulletin board;

FIG. 4 is a diagram illustrating an example of a road sign and a road marking;

FIG. 5 is a table illustrating a relationship among condition information, condition, and determination information;

FIGS. 9A-9B are tables illustrating examples of speed limit value information that are stored in a speed limit storage unit;

FIGS. 10A-10B are tables illustrating examples of speed limit value information that are stored in a speed limit storage unit;

FIGS. 14A-14B are tables illustrating examples of speed limit value information that are stored in a speed limit storage unit;

FIGS. 15A-15B are tables illustrating examples of speed limit value information that are stored in a speed limit storage unit;

FIG. 16 is a flowchart illustrating a flow of a process for displaying speed limit values;

FIG. 17 is a diagram illustrating an example of a screen for selecting a speed limit value;

FIGS. 18A-18D are diagrams illustrating examples of screen transition of screens for selecting a speed limit value;

FIGS. 20A-20D are diagrams illustrating examples of screen transition of screens for selecting a speed limit value; and FIGS. 21A-21D are diagrams illustrating examples of screen transition of screens for selecting a speed limit value in a case where a process for calculating display priority is executed.

DESCRIPTION OF EMBODIMENTS

In the following, embodiments will be described with reference to the drawings. Note that in the specification and the drawings, elements that have substantially the same functions and configurations are assigned the same codes, and duplicated description will be omitted.

First Embodiment

<1. Configuration of Setting Control System>

Figure 1:
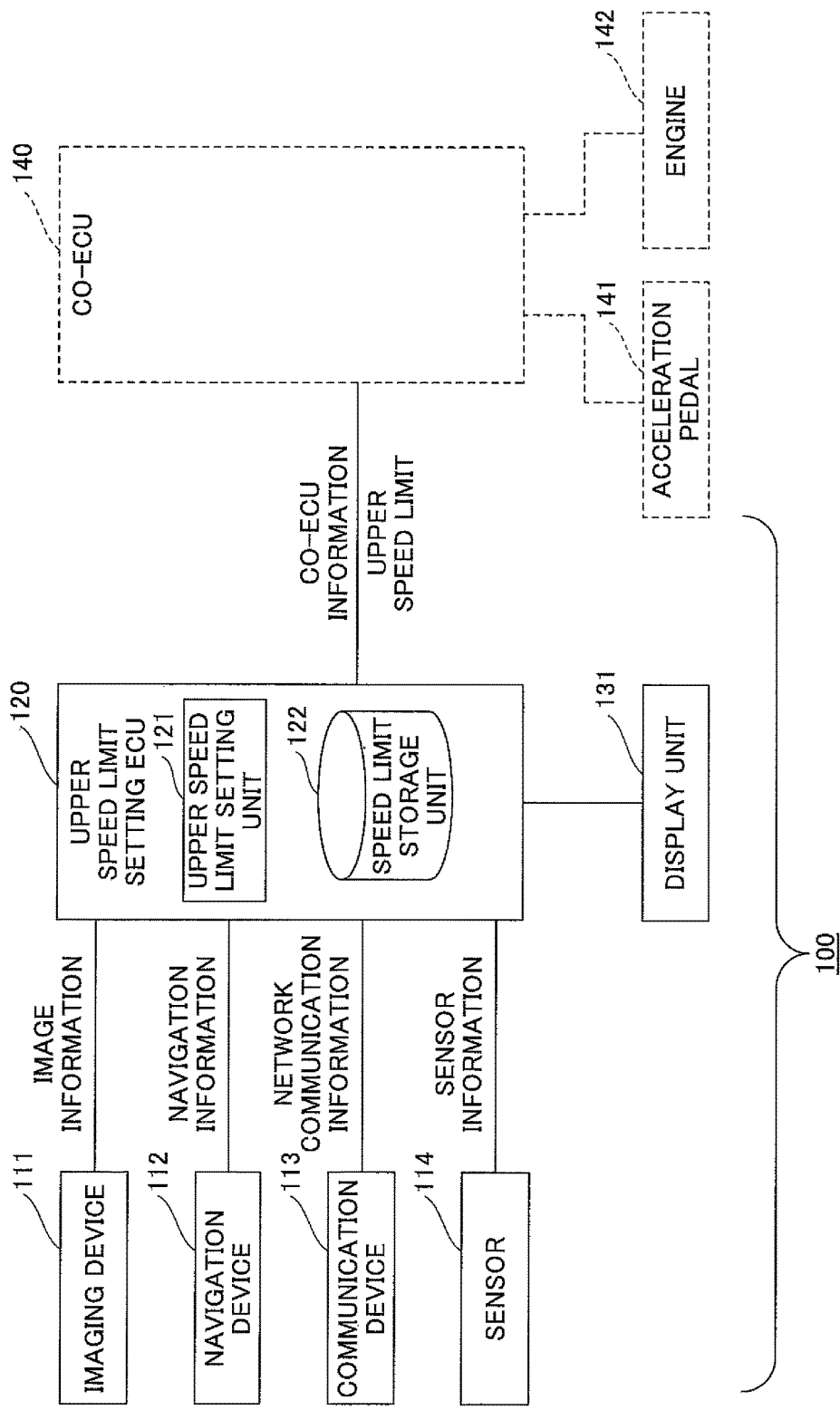
FIG. 1 is a diagram illustrating an example of a setting control system.

First, a configuration of a setting control system will be described that sets an upper speed limit used for limiting the speed of a vehicle. FIG. 1 is a diagram that illustrates an example of a setting control system. As illustrated in FIG. 1, the setting control system 100 includes an imaging device 111, a navigation device 112, a communication device 113, and sensors 114. The setting control system 100 also includes an upper speed limit setting ECU (Electronic Control Unit) 120 as an example of a setting device, and a display unit 131. Note that the setting control system 100 in the embodiment constitutes a vehicle control system in which the setting control system 100 is connected with a co-ECU 140 (a limiter device) that transmits and receives signals with an acceleration pedal 141, an engine 142, and the like, to limit the speed of the vehicle.

The imaging device 111 captures an image of a road sign, a road marking, an electric bulletin board, or the like on a road while the vehicle is traveling, and transmits the captured image information to the upper speed limit setting ECU 120. The navigation device 112 transmits positional information that represents the current position of the vehicle while traveling (for example, the latitude and the longitude), the type of the road on which the vehicle is traveling, and the like, to the upper speed limit setting ECU 120, as navigation information.

The communication device 113 is connected with a network such as the Internet, to obtain weather information including the weather at the position of the vehicle while traveling. Note that the communication device 113 transmits the information including the weather obtained by the connection to the network, to the upper speed limit setting ECU 120, as network communication information.

The sensors 114 include multiple sensors installed on the vehicle. The sensors 114 measure physical quantities, respectively. The sensors 114 include, for example, a temperature sensor to measure the air temperature around the vehicle, a rain sensor to measure the rain, and an operational sensor to measure the operational speed of a wiper that operates in the rain. Note that the physical quantities measured by the respective sensors included in the sensors 114 (the temperature information, the rain information, operational speed information of the wiper, etc.) are transmitted to the upper speed limit setting ECU 120, as sensor information.

The upper speed limit setting ECU 120 is a setting device that functions as an upper speed limit setting unit 121 by executing an upper speed limit setting program. The upper speed limit setting unit 121 extracts speed limit values based on image information transmitted from the imaging device 111, and stores the values in the speed limit storage unit 122. Also, the upper speed limit setting unit 121 displays the extracted speed limit values on the display unit 13. Further, the upper speed limit setting unit 121 transmits an upper speed limit based on one speed limit value selected based on a selection command by an occupant of the vehicle (for example, the driver) among the speed limit values displayed on the display unit 13, to the co-ECU 140. Thus, the upper speed limit setting unit 121 can set the upper speed limit based on the selected one speed limit value on the co-ECU 140.

The display unit 131 displays the speed limit values extracted by the upper speed limit setting unit 121 for the occupant of the vehicle. Also, the display unit 131 receives a selection command for the displayed speed limit values from the occupant of the vehicle, and transmits the received selection command to the upper speed limit setting ECU 120.

The co-ECU 140 is a limiter device that limits the vehicle speed, for example, by controlling the engine 142, based on the upper speed limit transmitted from the upper speed limit setting ECU 120, a stepping amount on the acceleration pedal 141, and the like. Also, in addition to limiting the vehicle speed, the co-ECU 140 transmits a current stepping amount on the acceleration pedal 141 of the vehicle (accelerator opening information) and the like, to the upper speed limit setting ECU 120 as co-ECU information.

Note that the example, in FIG. 1 is configured to have the imaging device 111, the navigation device 112, the communication device 113, and the sensors 114 connected with the upper speed limit setting ECU 120, to input various information items from these devices into the upper speed limit setting ECU 120. However, these devices may be connected with the co-ECU 140 to input various information items into the upper speed limit setting ECU 120 via the co-ECU 140.

Also, in the example in FIG. 1, the upper speed limit setting ECU 120 is provided as an ECU separate from the co-ECU 140. However, functions implemented by the upper speed limit setting ECU 120 may be implemented, for example, on the co-ECU 140. In other words, the upper speed limit setting ECU 120 may be integrated with the co-ECU 140 to constitute the vehicle control system.

<2. Hardware Configuration of Upper Speed Limit Setting ECU>

Figure 2:
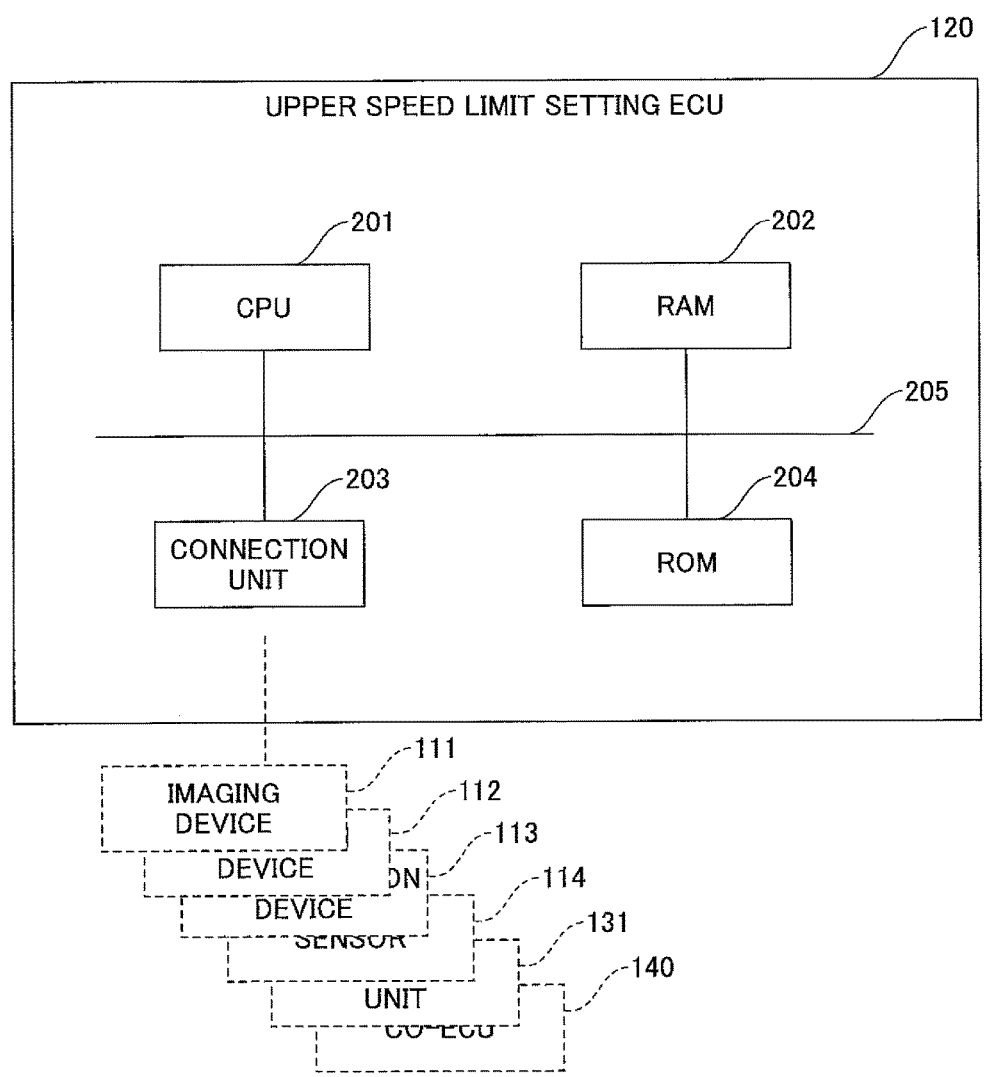
FIG. 2 is a diagram illustrating an example of a hardware configuration of an upper speed limit setting ECU.

Next, a hardware configuration of the upper speed limit setting ECU 120 will be described. FIG. 2 is a diagram illustrating an example of a hardware configuration of the upper speed limit setting ECU 120.

As illustrated in FIG. 2, the upper speed limit setting ECU 120 includes a CPU (Central Processing Unit) 201, a RAM (Random Access Memory) 202, a connection unit 203, and a ROM (Read-Only Memory) 204. Note that these units of the upper speed limit setting ECU 120 are mutually connected via a bus 205.

The CPU 201 processes various information items received via the connection unit 203, by executing a program (an upper speed limit setting program or the like) in the stored in the ROM 204, loaded on the RAM 202 as a work area. This makes the upper speed limit setting ECU 120 function as the upper speed limit setting unit 121.

<3. Description of Road Sign, Road Marking, and Electric Bulletin Board>

Next, a road sign, a road marking, and an electric bulletin board imaged by the imaging device 111 will be described using FIG. 3 and FIG. 4. FIG. 3 is a diagram illustrating an example of a road sign and an electric bulletin board. The diagram illustrates a road sign 320 and an electric bulletin board 330 disposed on a road 311 having two lines in each direction on which a vehicle 301 travels.

The road sign 320 shows two speed limit displays 321 and 322, each of which designates a speed limit value and associated condition information that specifies the type of a vehicle to which the speed limit value is applied.

From the condition information of the speed limit display 321, a condition is derived that specifies the type of the vehicle "being a bus, a motorcycle, or a car (except for a three-wheeler and a trailer)". Note that according to the speed limit display 321, the speed limit value of a vehicle that satisfies the condition is "100 km/h".

From the condition information of the speed limit display 322, a condition is derived that specifies the type of the vehicle "being a truck, a three-wheeler car, or a trailer car". Note that according to the speed limit display 322, the speed limit value of a vehicle that satisfies the condition is "80 km/h".

The electric bulletin board 330 is disposed close to the road sign 320. The electric bulletin board 330 shows one speed limit display 331. According to the speed limit display 331, the speed limit value of a vehicle is "50 km/h".

FIG. 4 is a diagram illustrating an example of a road sign and a road marking. The diagram illustrates road signs 420 and 430 disposed at separate places on a road 411 having two lines in each direction on which a vehicle 301 travels, and a road marking 440 displayed on another place on the road 411.

The road sign 420 shows two speed limit displays 421 and 422, each of which designates a speed limit value and associated condition information that specifies traveling hours during which the speed limit value is applied.

From the condition information of speed limit display 421, a condition is derived that traveling needs to be done below a speed limit value (="50 km/h") during hours "between 5:00 and 23:00". Note that according to speed limit display 421, the speed limit value of a vehicle traveling during hours that satisfy the condition is "50 km/h".

From the condition information of speed limit display 422, a condition is derived that traveling needs to be done below a speed limit value (="60 km/h") during hours "between 23:00 and 5:00". Note that according to speed limit display 422, the speed limit value of the vehicle traveling during hours that satisfy the condition is "60 km/h".

The road sign 430 shows four speed limit displays 431 to 434, each of which designates a speed limit value and associated condition information that specifies the type of the road and weather to which the speed limit value is applied.

From the condition information of the speed limit display 431, a condition is derived that specifies the type of the driving road being a "town road" on which traveling needs to be done below a speed limit value (="50 km/h"). Note that according to speed limit display 431, the speed limit value of a vehicle traveling on the road that satisfies the condition is "50 km/h".

From the condition information of the speed limit display 432, a condition is derived that specifies the type of the driving road being a "suburban road" on which traveling needs to be done below a speed limit value (="90 km/h"). Note that according to speed limit display 432, the speed limit value of a vehicle traveling on the road that satisfies the condition is "90 km/h".

From the condition information of the speed limit display 433, a condition is derived that specifies the type of the driving road being an "expressway" on which traveling needs to be done below a speed limit value (="130 km/h"). Note that according to speed limit display 433, the speed limit value of a vehicle traveling on the road that satisfies the condition is "130 km/h".

From the condition information of the speed limit display 434, conditions are derived in which one condition specifies the type of the driving road being an "expressway" on which traveling needs to be done below a speed limit value (="110 km/h"), and the other condition specifies weather under which traveling needs to be done below the speed limit value being a "rainy condition". Note that according to speed limit display 434, the speed limit value of a vehicle traveling on the road that satisfies the one condition, under weather that satisfies the other condition, is "110 km/h".

The road marking 440 shows two speed limit displays 441 and 442, each of which designates condition information based on the displayed position of the marking. From the condition information based on the displayed position of the speed limit display 441, a condition is derived that specifies the driving lane being a "lane on the left" on which traveling needs to be done below a speed limit value (="120 km/h"). Note that according to speed limit display 441, the speed limit value when traveling on the driving lane that satisfies the condition is "120 km/h".

From the condition information based on the displayed position of the speed limit display 442, a condition is derived that specifies the driving lane being a "lane on the right" on which traveling needs to be done below a speed limit value (="130 km/h"). Note that according to speed limit display 442, the speed limit value when traveling on the driving lane that satisfies the condition is "130 km/h".

<4. Relationship Among Condition Information, Condition, and Determination Information Designated on Road Sign, Road Marking, and Electric Bulletin Board>

Next, a relationship among condition information, condition, and determination information designated on a road sign, a road marking, and an electric bulletin board will be described.

As described using FIG. 3 and FIG. 4, a road sign, a road marking, and an electric bulletin board display various speed limit values along with condition information associated with the respective speed limit values. Further, from the condition information of each of the speed limit values, a condition to apply the speed limit value is derived.

When multiple speed limit values are extracted based on image information, the upper speed limit setting unit 121 in the embodiment obtains determination information for determining whether a condition(s) derived from each condition information item is satisfied, and determines whether the obtained determination information satisfies the condition(s).

It is assumed here that the determination information includes, for example, the type of the vehicle; the type of the road on which the vehicle is traveling; the driving lane on which the vehicle is traveling; the current time; the weather around the vehicle; the distance from the current position of the vehicle to the starting position at which the speed limit is applied; and the pedaling-based vehicle speed.

When displaying extracted speed limit values on the display unit 131, the upper speed limit setting unit 121 in the embodiment raises display priority for the speed limit values whose derived conditions are determined satisfied by the obtained determination information, and displays the speed limit values in descending order of the display priority. This is because such a function makes it possible for the occupant of the vehicle to select a speed limit value having a higher display priority with a few operations.

Thereupon, this function of the upper speed limit setting unit 121 will be described in the following. Note that the description starts with a relationship among condition information, condition, and determination information designated on a road sign, a road marking, and an electric bulletin board.

FIG. 5 is a table illustrating a relationship among condition information, condition, and determination information. As illustrated in FIG. 5, it is assumed that the "condition information" in the embodiment is generally classified into seven types of information.

The first condition information is information relating to the type of the vehicle, for example, as included in the speed limit display 321 of the road sign 320 in FIG. 3. In the case of the speed limit display 321, as illustrated in FIG. 5, the "condition derived from condition information" stores a condition of "the type of the vehicle being a bus, a motorcycle, or a car (except for a three-wheeler and a trailer)".

If the condition information is information relating to the type of the vehicle, as illustrated in FIG. 5, the "determination information for determining whether the condition is satisfied" is "the type of the vehicle", and the "information for obtaining the determination information" is "vehicle type information".

Also, the second condition information is information relating to the type of the road, for example, as included in the speed limit display 433 of the road sign 430 in FIG. 4. In the case of the speed limit display 433, as illustrated in FIG. 5, the "condition derived from condition information" stores a condition of "the type of the driving road being a motorway".

If the condition information is information relating to the type of the road, as illustrated in FIG. 5, the "determination information for determining whether the condition is satisfied" is "the type of the road on which the vehicle is traveling, and the "information for obtaining the determination information" is "navigation information".

Also, the third condition information is information relating to the driving lane, for example, as included in the speed limit display 441 of the road marking 440 in FIG. 4. In the case of the speed limit display 441, as illustrated in FIG. 5, the "condition derived from condition information" stores a condition of "the driving lane being the lane on the left".

If the condition information is information relating to the driving lane, as illustrated in FIG. 5, the "determination information for determining whether the condition is satisfied" is "the lane on which the vehicle is traveling", and the "information for obtaining the determination information" is "image information".

Also, the fourth condition information is information relating to traveling hours, for example, as included in the speed limit display 421 of the road sign 420 in FIG. 4. In the case of the speed limit display 421, as illustrated in FIG. 5, the "condition derived from condition information" stores a condition of "traveling hours between 5:00 and 23:00".

If the condition information is information relating to traveling hours, as illustrated in FIG. 5, the "determination information for determining whether the condition is satisfied" is "current time", and the "information for obtaining the determination information" is "time information".

Also, the fifth condition information is information relating to weather, for example, as included in the speed limit display 434 of the road sign 420 in FIG. 4. In the case of the speed limit display 434, as illustrated in FIG. 5, the "condition derived from condition information" stores a condition of "the weather being a rainy condition".

If the condition information is information relating to weather, as illustrated in FIG. 5, the "determination information for determining whether the condition is satisfied" is "the weather around the vehicle, and the "information for obtaining the determination information" is one of "navigation information" plus "network communication information", "sensor information (including operational speed information of the wiper, rain dropping information, and temperature information)", and "image information".

Also, the sixth condition information is information relating to the start position at which the speed limit value is applied, for example, as included in the speed limit display 431 of the road sign 420 in FIG. 4. In the case of the speed limit display 431, as illustrated in FIG. 5, the "condition derived from condition information" stores a condition of "the distance from the current position of the vehicle to the starting position at which the speed limit is applied (suburb) being the predetermined threshold or shorter".

If the condition information is information relating to start position, as illustrated in FIG. 5, the "determination information for determining whether the condition is satisfied" is "the distance from the current position of the vehicle to the starting position at which the speed limit is applied". Also, the "information for obtaining the determination information" is "navigation information".

Further, the seventh condition information is a speed limit value defined in additional priority information (details will be described later) that defines a relationship between a pedaling-based vehicle speed and the speed limit value. Note that the pedaling-based vehicle speed is an estimated speed of the vehicle that is calculated depending on the stepping amount on the acceleration pedal 141 when the speed is being limited by using an upper speed limit.

If the condition information is information relating to a speed limit value defined in the additional priority information, as illustrated in FIG. 5, the "condition derived from condition information" stores a condition of "the current pedaling-based vehicle speed being to raise the display priority of the speed limit". Also, the "determination information for determining whether the condition is satisfied" is "the pedaling-based vehicle speed", and the "information for obtaining the determination information" is the co-ECU information (accelerator opening information).

<5. Description of Additional Priority Information>

Figure 6A:
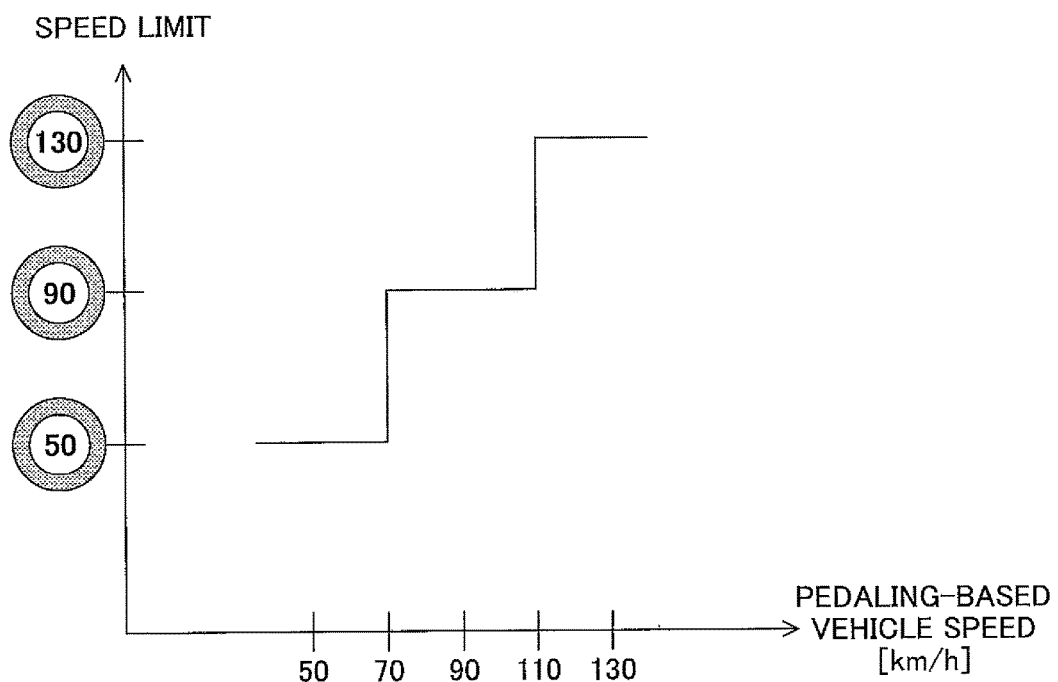
FIGS. 6A-6B are diagrams illustrating examples of additional priority information that defines a relationship between the pedaling-based vehicle speed and the speed limit value.
Figure 6B:
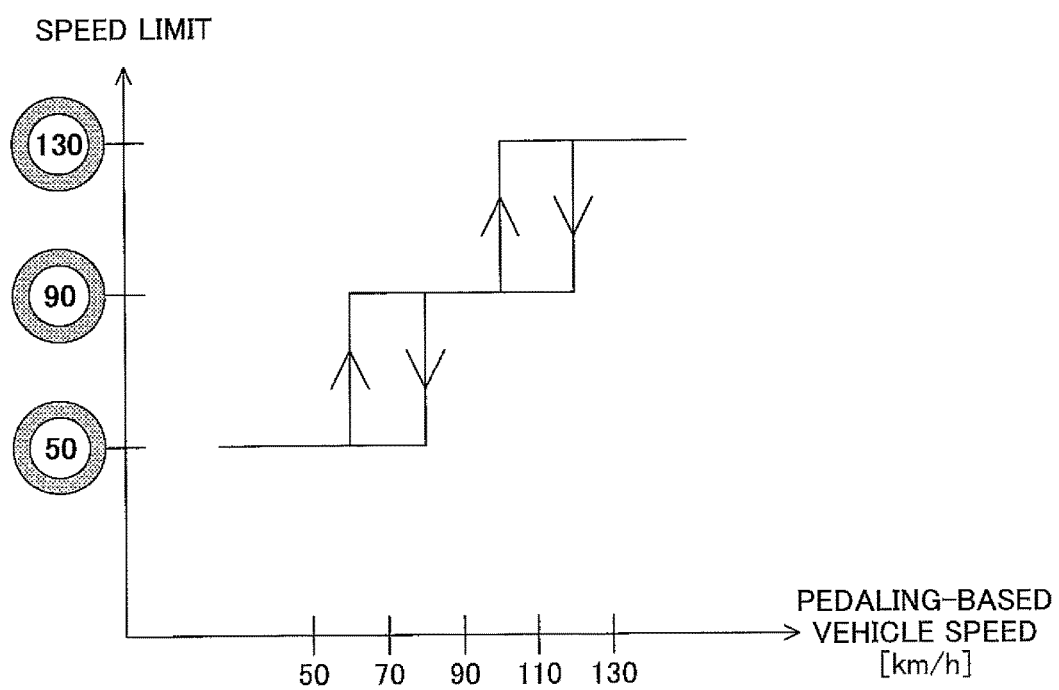

Here, additional priority information will be briefly described, which is the seventh condition information defining a relationship between the pedaling-based vehicle speed and the speed limit value. FIGS. 6A-6B are diagrams illustrating examples of the additional priority information that defines a relationship between the pedaling-based vehicle speed and the speed limit value. In FIG. 6A, the horizontal axis represents the pedaling-based vehicle speed, and the vertical axis represents the speed limit value.

An example in FIG. 6A illustrates that the pedaling-based vehicle speed up to "70 km/h" raises the display priority of a speed limit value speed that is equal to "50 km/h". Also, the pedaling-based vehicle speed between "70 km/h" and "110 km/h" raises the display priority of a speed limit value speed that is equal to "90 km/h". Further, the pedaling-based vehicle speed between "110 km/h" and "130 km/h" raises the display priority of a speed limit value speed that is equal to "130 km/h".

On the other hand, FIG. 6B illustrates additional priority information in which speed limit values whose display priority to be raised are different depending on whether the pedaling-based vehicle speed is increasing or decreasing.

An example in FIG. 6B illustrates that in a state where the pedaling-based vehicle speed is increasing, the pedaling-based vehicle speed up to "60 km/h" raises the display priority of a speed limit value speed that is equal to "50 km/h". Further, the pedaling-based vehicle speed between "60 km/h" and "100 km/h" raises the display priority of a speed limit value speed that is equal to "90 km/h". Furthermore, the pedaling-based vehicle speed over "100 km/h" raises the display priority of a speed limit value speed that is equal to "130 km/h".

On the contrary, in a state where the pedaling-based vehicle speed is decreasing, the pedaling-based vehicle speed over "120 km/h" raises the display priority of a speed limit value speed that is equal to "130 km/h". Also, the pedaling-based vehicle speed between "80 km/h" and "120 km/h" raises the display priority of a speed limit value speed that is equal to "90 km/h". Further, the pedaling-based vehicle speed below "80 km/h" raises the display priority of a speed limit value speed that is equal to "50 km/h".

In this way, in the embodiment, based on additional priority information that defines a relationship between the pedaling-based vehicle speed and the speed limit value, the pedaling-based vehicle speed is determined whether to satisfy one of the conditions, and if satisfies, the display priority of the corresponding speed limit value is raised. This makes it possible to prioritize displaying the speed limit value corresponding to the stepping amount on the acceleration pedal 141 by the driver.

<6. Functional Configuration of Upper Speed Limit Setting ECU>

Figure 7:
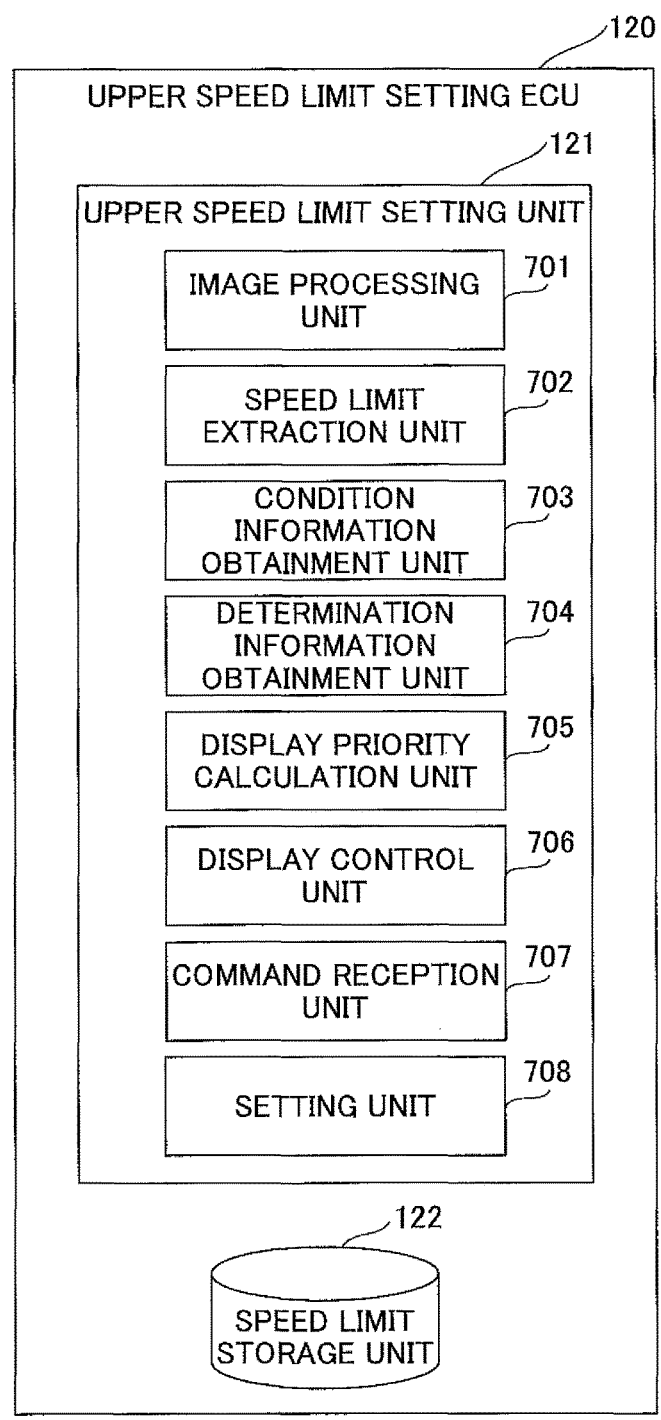
FIG. 7 is a diagram illustrating an example of a detailed functional configuration of an upper speed limit setting ECU.

Next, a functional configuration of the upper speed limit setting ECU 120 that functions as the upper speed limit setting unit 121 will be described in detail. FIG. 7 is a diagram illustrating an example of a detailed functional configuration of the upper speed limit setting ECU 120. As illustrated in FIG. 7, the upper speed limit setting unit 121 includes an image processing unit 701, a speed limit extraction unit 702, a condition information obtainment unit 703, a determination information obtainment unit 704, a display priority calculation unit 705, a display control unit 706, a command reception unit 707, and a setting unit 708.

The image processing unit 701 identifies an area of a signage such as a road sign, a road marking, and an electric bulletin board, that specifies a speed limit value, based on image information transmitted from the imaging device 111.

The speed limit extraction unit 702 extracts an image area that designates a speed limit value in the area identified by the image processing unit 701. Also, the speed limit extraction unit 702 applies character recognition to the extracted image area, to extract a speed limit value included in the area. Further, the speed limit extraction unit 702 associates the extracted image area and the extracted speed limit value, with positional information of the vehicle when the image information has been captured (positional information about the captured image) and time information when the image information has been captured (time information about the captured image), and stores the associated data in the speed limit storage unit 122.

The condition information obtainment unit 703 has a function to serve as a derivation unit that obtains condition information based on the area of the signage identified by the image processing unit 701 in the image information, and derives the condition based on the obtained condition information. Specifically, if the area of the signage includes information relating to the type of the vehicle, the condition information obtainment unit 703 obtains information relating to the type of the vehicle as the first condition information. Then, the condition information obtainment unit 703 analyzes the obtained first condition information, to derive the condition to raise the display priority of the corresponding speed limit value, and stores the condition in the speed limit storage unit 122.

Also, if the area of the signage includes information relating to the type of the road, the condition information obtainment unit 703 obtains information relating to the type of the road as the second condition information. Then, the condition information obtainment unit 703 analyzes the obtained second condition information, to derive the condition to raise the display priority of the corresponding speed limit value, and stores the condition in the speed limit storage unit 122.

Also, if the area of the signage includes information relating to the driving lane, the condition information obtainment unit 703 obtains information relating to the driving lane as the third condition information. Then, the condition information obtainment unit 703 analyzes the obtained third condition information, to derive the condition to raise the display priority of the corresponding speed limit value, and stores the condition in the speed limit storage unit 122.

Also, if the area of the signage includes information relating to traveling hours, the condition information obtainment unit 703 obtains information relating to the traveling hours as the fourth condition information. Then, the condition information obtainment unit 703 analyzes the obtained fourth condition information, to derive the condition to raise the display priority of the corresponding speed limit value, and stores the condition in the speed limit storage unit 122.

Also, if the area of the signage includes information relating to weather, the condition information obtainment unit 703 obtains information relating to the weather as the fifth condition information. Then, the condition information obtainment unit 703 analyzes the obtained fifth condition information, to derive the condition to raise the display priority of the corresponding speed limit value, and stores the condition in the speed limit storage unit 122.

Also, if the area of the signage includes information relating to the start position, the condition information obtainment unit 703 obtains information relating to the start position as the sixth condition information. Then, the condition information obtainment unit 703 analyzes the obtained sixth condition information, to derive the condition to raise the display priority of the corresponding speed limit value, and stores the condition in the speed limit storage unit 122.

Further, if the area of the signage includes a speed limit defined in the additional priority information, the condition information obtainment unit 703 obtains the speed limit defined in the additional priority information as the seventh condition information. Then, the condition information obtainment unit 703 analyzes the obtained seventh condition information, to derive the condition to raise the display priority of the corresponding speed limit value, and stores the condition in the speed limit storage unit 122.

The determination information obtainment unit 704 has a function to serve as an obtainment unit to obtain determination information for determining whether a condition derived by the condition information obtainment unit 703 is satisfied. Specifically, the determination information obtainment unit 704 recognizes the type of the vehicle, the type of the road on which the vehicle is traveling, the lane on which the vehicle is traveling, the current time, and the weather around the vehicle, and calculates the distance from the current position of the vehicle to the starting position at which the speed limit is applied, and the pedaling-based vehicle speed.

The display priority calculation unit 705 compares the determination information obtained by the determination information obtainment unit 704, with the condition derived by the condition information obtainment unit 703, to determine an extent to which the determination information satisfies the condition (here, satisfies or does not satisfy). Also, the display priority calculation unit 705 raises the display priority of the speed limit value that corresponds to the condition determined as satisfied. In other words, the display priority calculation unit 705 has functions to serve as a determination unit to determine an extent to which the determination information satisfies the condition, and as a calculation unit to calculate the display priority of the speed limit value based on the determination result. Note that, the display priority calculation unit 705 indicates the display priority of each of the speed limit values to the display control unit 706.

The display control unit 706 has a function to serve as a display control unit to display the image areas stored in the speed limit storage unit 122 (image areas designating the respective speed limit values) on the display unit 13 as the speed limit values to be selected. The display control unit 706 displays all image areas stored in the speed limit storage unit 122 while the vehicle travels for a predetermined distance, as the speed limit values to be selected. Alternatively, the display control unit 706 displays all image areas stored in the speed limit storage unit 122 while a predetermined time passes, as the speed limit values to be selected. However, these functions are not applied if the vehicle has made a right turn or a left turn, and the driving road has changed. In other words, it is assumed that when the driving road changes, the image areas stored in the speed limit storage unit 122 before the road changes are excluded from the speed limit values to be selected, even if the vehicle travels for the predetermined distance or the predetermined time passes.

The display control unit 706 sorts the speed limit values (speed limit values extracted by the speed limit extraction unit 702, and stored in the speed limit storage unit 122) in descending order of the priority indicated by the display priority calculation unit 705. Also, the display control unit 706 displays a screen for selecting a speed limit value for each of the speed limit values sorted in descending order of the display priority. Thus, the speed limit values are displayed in descending order of the display priority.

The command reception unit 707 has a function to serve as a reception unit to receive a selection command for a speed limit value displayed on the display unit 13, input by the occupant of the vehicle on the display unit 131. Also, in response to receiving a selection command, the command reception unit 707 indicates the corresponding speed limit value associated with the image area and stored in the speed limit storage unit 122, to the setting unit 708.

The setting unit 708 has a function to serve as a setting unit to transmit an upper speed limit based on the speed limit value indicated by the command reception unit 707, to the co-ECU 140 to set the upper speed limit on the co-ECU 140.

<7. Details of Determination Information Obtainment Unit>

Figure 8:
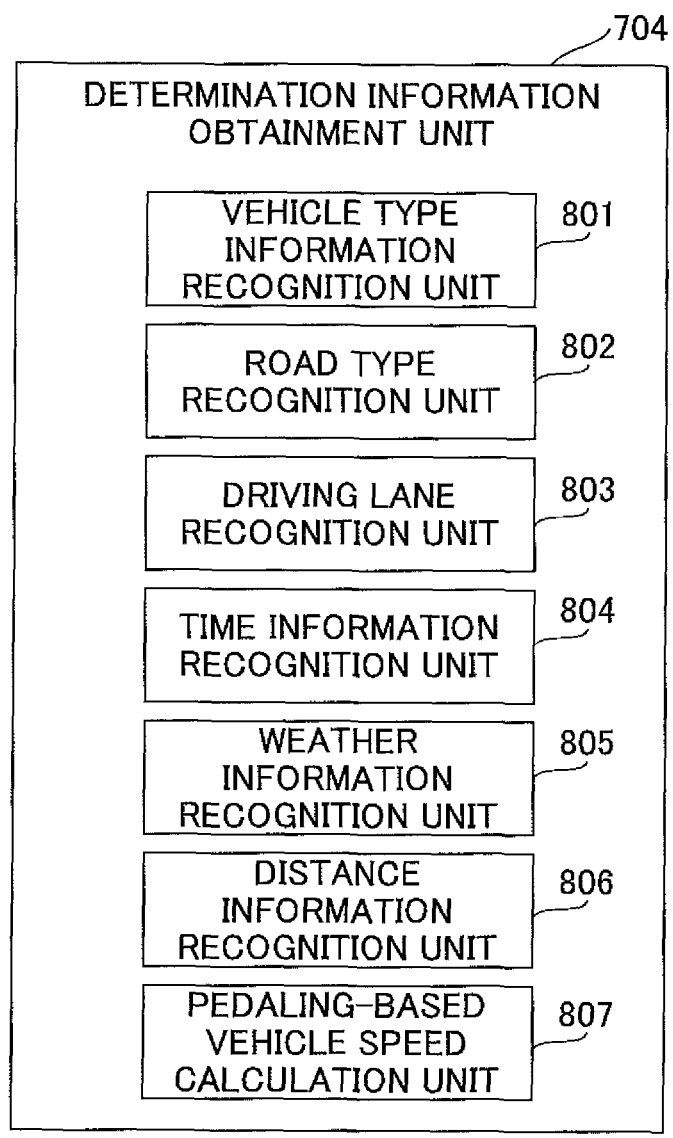
FIG. 8 is a diagram illustrating an example of a detailed functional configuration of a determination information obtainment unit.

Next, the determination information obtainment unit 704 will be described in detail. FIG. 8 is a diagram illustrating an example of a detailed functional configuration of the determination information obtainment unit 704.

As illustrated in FIG. 8, the determination information obtainment unit 704 includes a vehicle type information recognition unit 801, a road type recognition unit 802, a driving lane recognition unit 803, a time information recognition unit 804, a weather information recognition unit 805, a distance information recognition unit 806, and a pedaling-based vehicle speed calculation unit 807.

The vehicle type information recognition unit 801 recognizes information about the type of the vehicle (for example, a large-size passenger car, a middle-size passenger car, a large-size truck, a middle-size truck, an ordinary car, a large-size motorcycle, an ordinary motorcycle, a three-wheeler car, etc.). It is assumed in the embodiment that the information about the type of the vehicle is stored in the ROM 204 of the upper speed limit setting ECU 120, as the vehicle type information. Therefore, the vehicle type information recognition unit 801 reads the vehicle type information from the ROM 204, to recognize the information about the type of the vehicle.

The road type recognition unit 802 recognizes the type of the road on which the vehicle is traveling (for example, a town road, a suburban road, a road having one lane in each direction, a road having two lanes in each direction, a motorway, an expressway, etc.), based on the navigation information transmitted from the navigation device 112.

The driving lane recognition unit 803 identifies a lane marking based on the image information transmitted from the imaging device 111, and recognizes a lane on which the vehicle is traveling.

The time information recognition unit 804 recognizes time information. It is assumed that in the embodiment, the upper speed limit setting ECU 120 has a clock function installed to output a current time, and the time information recognition unit 804 recognizes the current time output from the installed clock function, as the time information.

The weather information recognition unit 805 identifies a current position of the vehicle, based on the navigation information transmitted from the navigation device 112. Also, the weather information recognition unit 805 extracts weather information at the identified current position in weather information included in the network communication information transmitted from the communication device 113, to recognize the weather around the vehicle.

The distance information recognition unit 806 identifies the start position at which the speed limit value is applied based on the navigation information transmitted from the navigation device 112. If the condition information obtainment unit 703 has obtained the sixth condition information, the distance information recognition unit 806 determines the type of the road on which speed limit value is applied, based on the sixth condition information, and identifies the position on the determined type of the road, based on the navigation information. Thus, the distance information recognition unit 806 identifies the start position at which the speed limit value is applied.

Also, the distance information recognition unit 806 identifies the current position of the vehicle based on the navigation information. Further, the distance information recognition unit 806 calculates the distance from the identified current position of the vehicle to the start position at which the speed limit value is applied.

The pedaling-based vehicle speed calculation unit 807 obtains a stepping amount on the acceleration pedal 141 (accelerator opening information) from the co-ECU information transmitted from the co-ECU 140, and calculates the pedaling-based vehicle speed of the vehicle corresponding to the obtained stepping amount.

Note that the methods for obtaining the determination information by the units of the determination information obtainment unit 704 are just examples, and the determination information may be obtained by methods different from the methods described above. For example, the determination information may be obtained by a method for recognizing the driving lane based on inter-vehicle communication, or by a method for recognizing weather information based on the sensor information and the image information.

<8. Description of Speed Limit Storage Unit>

Next, speed limit value information stored in the speed limit storage unit 122 will be described using FIGS. 9A-10B. FIGS. 9A-10B are tables illustrating examples of speed limit value information that are stored in the speed limit storage unit 122. As illustrated in FIGS. 9A-10B, speed limit value information 910, 920, 1010 and 1020 stored in the speed limit storage unit 122 include, as information items, "time information about the captured image", "positional information about the captured image", and "the type of the signage", in addition to "the image area of the speed limit", "condition information", "speed limit value", and "condition".

The "time information about the captured image" stores date and time when the image information has been captured. Note that if the same road sign, road marking also, or electric bulletin board has been repeatedly captured, and multiple image information items have been obtained, the date and time of the latest captured image information are stored.

The "positional information about the captured image" stores positional information of the vehicle (for example, the latitude and the longitude) on the date and time stored in the "time information about the captured image".

The "type of the signage" stores the identified type of the signage (the road sign, the road marking, the electric bulletin board, etc.).

The "image area of the speed limit" stores the image area (image data) if the area of the signage, such as a road sign, a road marking, or an electric bulletin board that specifies a speed limit value, has been identified based on the image information, and the image area designating the speed limit value has been extracted from the identified area.

The "speed limit value" stores a speed limit value (text data) extracted by applying character recognition to the image area stored in "the image area of the speed limit".

The "condition information" stores one of the first to seventh condition information items obtained based on the area of the signage identified by the image processing unit 701.

The "condition" stores a condition derived by analyzing the condition information stored in the "condition information".

Note that FIG. 9A illustrates speed limit value information 910 stored in the speed limit storage unit 122, based on the areas of the road sign 320 and the electric bulletin board 330 identified by the image processing unit 701. Also, FIG. 9B illustrates speed limit value information 920 stored in the speed limit storage unit 122, based on the area of the road sign 420 identified by the image processing unit 701.

Also, FIG. 10A illustrates speed limit value information 1010 stored in the speed limit storage unit 122, based on the area of the road sign 430 identified by the image processing unit 701. Further, FIG. 103 illustrates speed limit value information 1020 stored in the speed limit storage unit 122, based on the area of the road sign 440 identified by the image processing unit 701.

<9. Flow of Process for Setting Upper Speed Limit>

Figure 11:
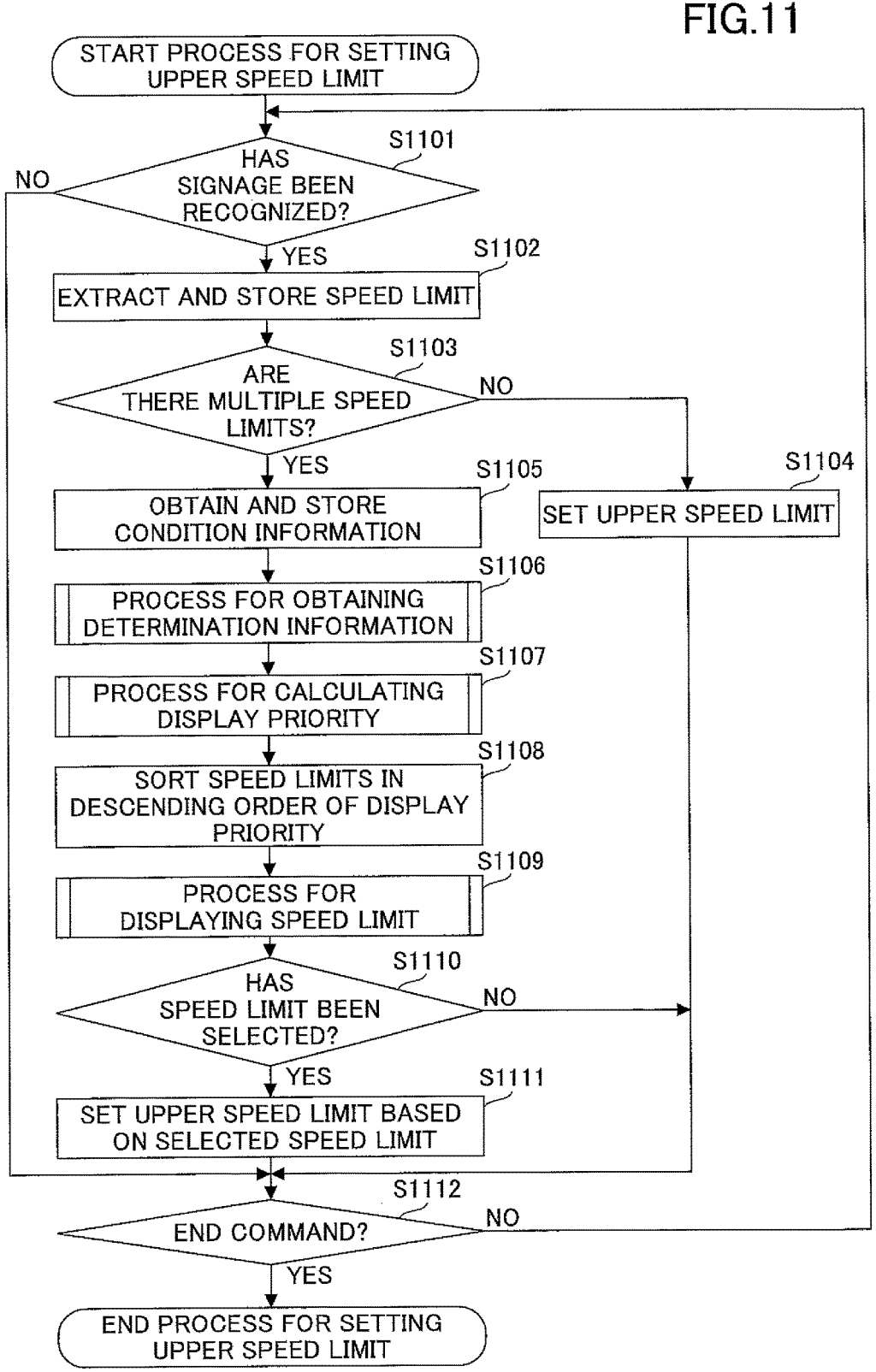
FIG. 11 is a flowchart illustrating a flow of a process for setting an upper speed limit.

Next, a flow of a process for setting an upper speed limit by the upper speed limit setting unit 121 will be described. FIG. 11 is a flowchart illustrating a flow of a process for setting an upper speed limit by the upper speed limit setting unit 121.

At Step S1101, the image processing unit 701 receives image information transmitted from the imaging device 111. Further, the image processing unit 701 processes the received image information, to determine whether the area of the signage, such as a road sign, a road marking, and an electric bulletin board, that specifies a speed limit value, is identified.

If having determined at Step S1101 that the area of the signage has not been identified, the process goes forward to Step S1112. On the other hand, if having determined at Step S1101 that the area of the signage has been identified, the process goes forward to Step S1102.

At Step S1102, the speed limit extraction unit 702 extracts an image area that designates a speed limit value in the area identified at Step S1101. Also, also, the speed limit extraction unit 702 applies character recognition to the extracted image area, to extract a speed limit value designated in the area. Further, the speed limit extraction unit 702 associates the extracted image area and the extracted speed limit value, with the positional information about the captured image and the time information about the captured image, and stores the associated data in the speed limit storage unit 122.

At Step S1103, the speed limit extraction unit 702 determines whether multiple speed limit values have been extracted at Step S1102. If having determined at Step S1103 that multiple speed limit values do not exist, the process goes forward to Step S1104.

At Step S1104, the setting unit 708 transmits an upper speed limit based on the speed limit value stored at Step S1102 to the co-ECU 140, to set the upper speed limit on the co-ECU 140.

On the other hand, if having determined at Step S1103 that multiple speed limit values exist, the process goes forward to Step S1105.

At Step S1105, the condition information obtainment unit 703 obtains condition information based on the area of the signage identified by the image processing unit 701. Also, the condition information obtainment unit 703 analyzes the obtained condition information, to derive the condition to raise the display priority for each of the speed limit values extracted at Step S1102, and stores the conditions in the speed limit storage unit 122.

At Step S1106, the determination information obtainment unit 704 obtains determination information. Specifically, the determination information obtainment unit 704 recognizes the type of the vehicle, the type of the road on which the vehicle is traveling, the lane on which the vehicle is traveling, the current time, and the weather around the vehicle, and calculates the distance from the current position of the vehicle to the starting position at which the speed limit is applied, and the pedaling-based vehicle speed. Note that the process for obtaining determination information will be described in detail later.

At Step S1107, the display priority calculation unit 705 determines an extent to which the determination information obtained at Step S1106, satisfies the condition derived at Step S1105 (satisfies or does not satisfy). Also, the display priority calculation unit 705 calculates the display priority for each of the speed limit values based on the determination result. Note that the process for calculating the display priority will be described in detail later.

At Step S1108, the display control unit 706 sorts the speed limit values in descending order of the display priority calculated by the display priority calculation unit 705. Thus, the speed limit values to be selected are sorted in descending order of the display priority calculated by the process for calculating display priority.

At Step S1109, the display control unit 706 executes a process for displaying the speed limit values (the image areas designating the speed limit values) read from the speed limit storage unit 122. Note that the process for displaying the speed limit values will be described in detail later.

At Step S1110, the command reception unit 707 determines whether the occupant of the vehicle has input a selection command to select one of the speed limit values to be selected displayed on the display unit 13.

If having determined at Step S1110 that the occupant of the vehicle has input a selection command, the command reception unit 707 identifies the image area designating the speed limit value selected by the selection command. Also, the command reception unit 707 refers to the speed limit storage unit 122, to read the speed limit value associated and stored with the identified image area, and indicates the speed limit value to the setting unit 708.

At Step S1111, the setting unit 708 transmits the upper speed limit based on the speed limit value indicated by the command reception unit 707, to the co-ECU 140 to set the upper speed limit on the co-ECU 140, and the process goes forward to Step S1112.

On the other hand, if having determined at Step S1110 that the occupant of the vehicle has not input a selection command, the process directly goes forward to Step S1112.

At Step S1112, the image processing unit 701 determines whether a command to end the process for setting an upper speed limit has been input. If having determined at Step S1112 that a command to end the process for setting an upper speed limit has not been input, the process goes back to Step S1101.

On the other hand, if having determined at Step S1112 that a command to end the process for setting an upper speed limit has been input, the process for setting an upper speed limit ends.

<10. Flow of Process for Obtaining Determination Information>

Figure 12:
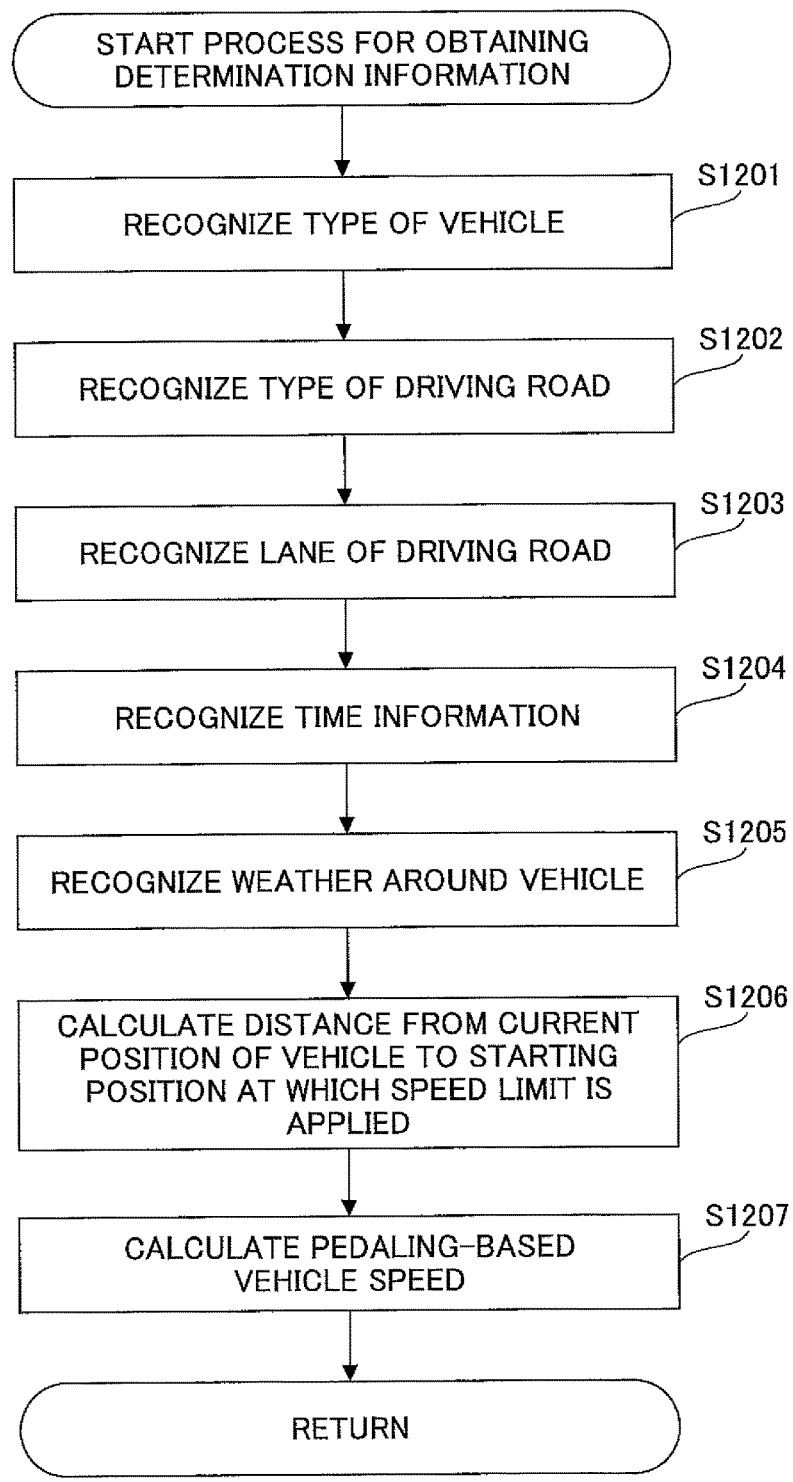
FIG. 12 is a flowchart illustrating a flow of a process for obtaining determination information.

Next, a process for obtaining determination information (Step S1106 in FIG. 11) will be described in detail. FIG. 12 is a flowchart illustrating the flow of the process for obtaining determination information.

At Step S1201, the vehicle type information recognition unit 801 reads the vehicle type information, for example, from the ROM 204, to recognize the information about the type of the vehicle.

At Step S1202, the road type recognition unit 802 recognizes the type of the road on which the vehicle is traveling, for example, based on the navigation information transmitted from the navigation device 112.

At Step S1203, the driving lane recognition unit 803 identifies a lane marking, for example, based on the image information transmitted from the imaging device 111, and recognizes a lane on which the vehicle is traveling.

At Step S1204, the time information recognition unit 804 recognizes the current time, for example, output from the clock function installed in the upper speed limit setting ECU 120. At Step S1205, the weather information recognition unit 805 identifies a current position of the vehicle, for example, based on the navigation information transmitted from the navigation device 112. Further, the weather information recognition unit 805 extracts weather information at the identified current position, for example, in weather information included in the network communication information transmitted from the communication device 113, to recognize the weather around the vehicle.

At Step S1206, the distance information recognition unit 806 identifies the start position at which the speed limit value is applied, and identifies the current position of the vehicle, for example, based on the navigation information transmitted from the navigation device 112. Further, the distance information recognition unit 806 calculates the distance from the current position of the vehicle to the start position at which the speed limit value is applied (referred to as the "distance to the start position", below).

At Step S1207, the pedaling-based vehicle speed calculation unit 807 obtains a stepping amount on the acceleration pedal 141 (accelerator opening information), for example, from the co-ECU information transmitted from the co-ECU 140, and calculates the pedaling-based vehicle speed of the vehicle corresponding to the obtained stepping amount.

<11. Flow of Process for Calculating Display Priority>

Figure 13:
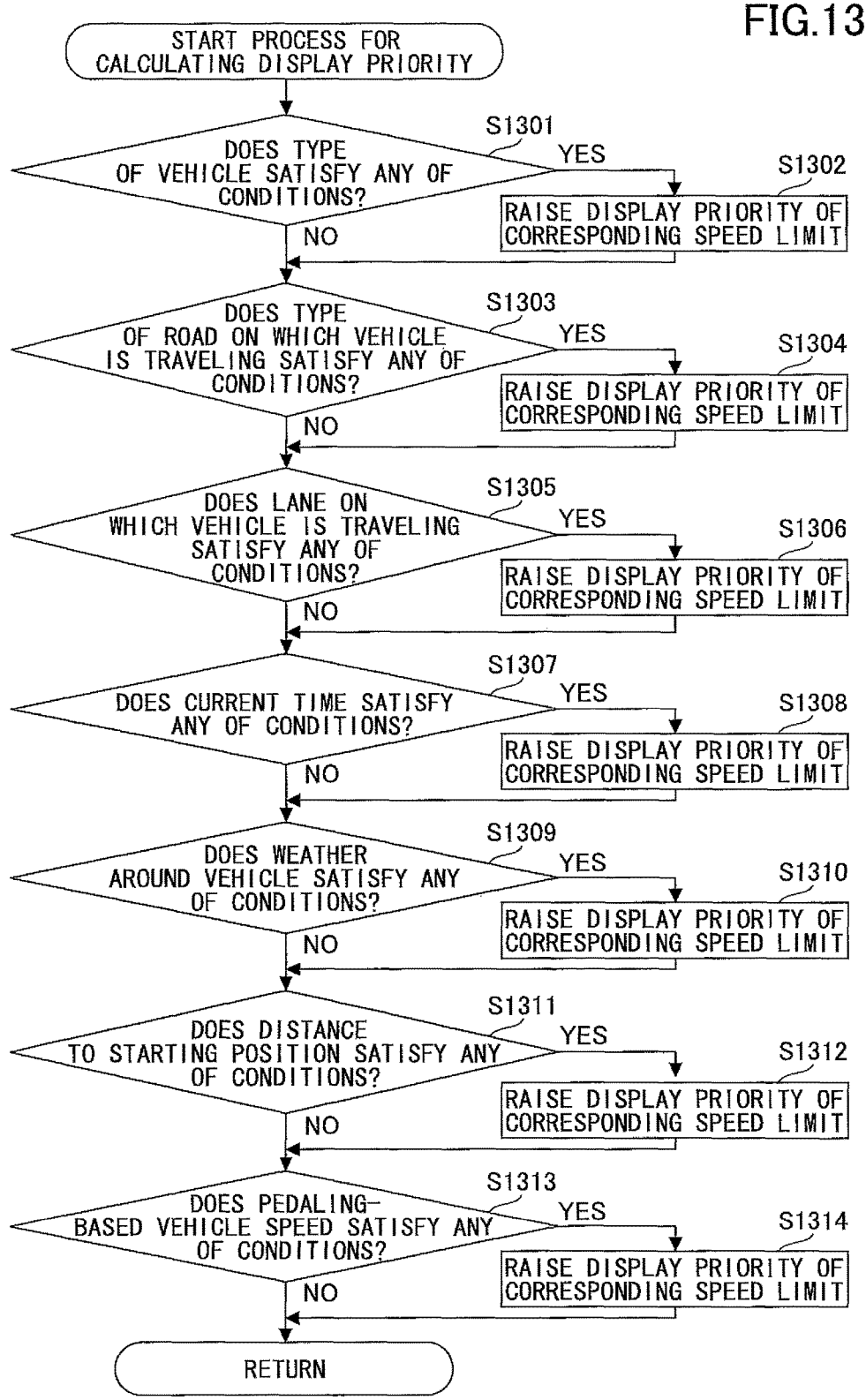
FIG. 13 is a flowchart illustrating a flow of a process for calculating display priority.

Next, a process for calculating display priority (Step S1107 in FIG. 11) will be described in detail. FIG. 13 is a flowchart illustrating the flow of the process for calculating display priority.

At Step S1301, the display priority calculation unit 705 determines whether the determination information (the type of the vehicle) obtained at Step S1201 (in FIG. 12) satisfies the condition stored in the speed limit storage unit 122 at Step S1105 (in FIG. 11).

If having determined at Step S1301 that the condition is satisfied, the process goes forward to Step S1302. At Step S1302, the display priority calculation unit 705 raises the display priority of the speed limit value that corresponds to the condition determined as satisfied. On the other hand, if having determined at Step S1301 that the condition is not satisfied, the process goes forward to Step S1303.

At Step S1303, the display priority calculation unit 705 determines whether the determination information (the type of the road on which the vehicle is traveling) obtained at Step S1202 (in FIG. 12) satisfies the condition stored in the speed limit storage unit 122 at Step S1105 (in FIG. 11).

If having determined at Step S1303 that the condition is satisfied, the process goes forward to Step S1304. At Step S1304, the display priority calculation unit 705 raises the display priority of the speed limit value that corresponds to the condition determined as satisfied. On the other hand, if having determined at Step S1303 that the condition is not satisfied, the process goes forward to Step S1305.

At Step S1305, the display priority calculation unit 705 determines whether the determination information (the lane on which the vehicle is traveling) recognized at Step S1203 (in FIG. 12) satisfies the condition stored in the speed limit storage unit 122 at Step S1105 (in FIG. 11).

If having determined at Step S1305 that the condition is satisfied, the process goes forward to Step S1306. At Step S1306, the display priority calculation unit 705 raises the display priority of the speed limit value that corresponds to the condition determined as satisfied. On the other hand, if having determined at Step S1305 that the condition is not satisfied, the process goes forward to Step S1307.

At Step S1307, the display priority calculation unit 705 determines whether the determination information (the current time) obtained at Step S1204 (in FIG. 12) satisfies the condition stored in the speed limit storage unit 122 at Step S1105 (in FIG. 11).

If having determined at Step S1307 that the condition is satisfied, the process goes forward to Step S1308. At Step S1308, the display priority calculation unit 705 raises the display priority of the speed limit value that corresponds to the condition determined as satisfied. On the other hand, if having determined at Step S1307 that the condition is not satisfied, the process goes forward to Step S1309.

At Step S1309, the display priority calculation unit 705 determines whether the determination information (the weather around the vehicle) recognized at Step S1205 (in FIG. 12) satisfies the condition stored in the speed limit storage unit 122 at Step S1105 (in FIG. 11).

If having determined at Step S1309 that the condition is satisfied, the process goes forward to Step S1310. At Step S1310, the display priority calculation unit 705 raises the display priority of the speed limit value that corresponds to the condition determined as satisfied. On the other hand, if having determined at Step S1309 that the condition is not satisfied, the process goes forward to Step S1311.

At Step S1311, the display priority calculation unit 705 determines whether the determination information (the distance to the start position) calculated at Step S1206 (in FIG. 12) satisfies the condition stored in the speed limit storage unit 122 at Step S1105 (in FIG. 11). At Step S1311, if the distance to the start position is less than or equal to the predetermined threshold, the display priority calculation unit 705 determines that the condition is satisfied, and the process goes forward to Step S1312.

At Step S1312, the display priority calculation unit 705 raises the display priority of the speed limit value that corresponds to the condition determined as satisfied. On the other hand, if having determined at Step S1311 that the condition is not satisfied, the process goes forward to Step S1313.

At Step S1313, the display priority calculation unit 705 determines whether the determination information (the pedaling-based vehicle speed) calculated at Step S1207 (in FIG. 12) satisfies the condition stored in the speed limit storage unit 122 at Step S1105 (in FIG. 11). If having determined at Step S1313 that the condition is satisfied, the process goes forward to Step S1314.

At Step S1314, the display priority calculation unit 705 raises the display priority of the speed limit value that corresponds to the condition determined as satisfied. On the other hand, if having determined at Step S1313 that the condition is not satisfied, the process goes back to Step S1108 in FIG. 11.

<12. Specific Examples of Process for Calculating Display Priority>

Next, specific examples of the process for calculating display priority will be described using FIGS. 14A-15B. FIGS. 14A-15B are tables for illustrating specific examples of the process for calculating display priority. Each specific example illustrated in FIGS. 14A-15B illustrates calculation of the display priority for each of the speed limit value information items 910, 920, 1010 and 1020 illustrated in FIGS. 9A-10B (namely, traveling situations illustrated in FIG. 3 and FIG. 4), in a state described below.

(1) Situation 1

Suppose that the following determination information is obtained by the determination information obtainment unit 704, for a speed limit value that has been stored in the speed limit value information 1410 in FIG. 14A:

the type of the vehicle recognized by the vehicle type information recognition unit 801="ordinary car";

the type of the road on which the vehicle is traveling recognized by the road type recognition unit 802="road having two lines in each direction" in "suburb";

the lane on which the vehicle is traveling recognized by the driving lane recognition unit 803="lane on the right";

the time information recognized by the time information recognition unit 804="14:32";

the weather around the vehicle recognized by the weather information recognition unit 805="fair";

the distance to the start position recognized by the distance information recognition unit 806="0 m"; and the pedaling-based vehicle speed calculated by the pedaling-based vehicle speed calculation unit 807="50 km/h".

In this case, for the "speed limit value" equal to "100 km/h", the determination information satisfies the condition for "the type of the vehicle", and the condition for "the distance to the start position" among the conditions stored in the "condition". Therefore, "2" is stored in the "display priority.

Also, for the "speed limit value" equal to "80 km/h", the determination information satisfies the condition for "the distance to the start position" among the conditions stored in the "condition". Therefore, "1" is stored in the "display priority.

Further, for the "speed limit value" equal to "50 km/h", the determination information satisfies the condition for "the distance to the start position", and the condition for "the pedaling-based vehicle speed" among the conditions stored in the "condition". Therefore, "2" is stored in the "display priority.

(2) Situation 2

Suppose that the following determination information is obtained by the determination information obtainment unit 704, for a speed limit value that has been stored in the speed limit value information 1420 in FIG. 14B:

the type of the vehicle recognized by the vehicle type information recognition unit 801="ordinary car";

the type of the road on which the vehicle is traveling recognized by the road type recognition unit 802="road having two lines in each direction" in "suburb";

the lane on which the vehicle is traveling recognized by the driving lane recognition unit 803="lane on the right";

the time information recognized by the time information recognition unit 804="11:43";

the weather around the vehicle recognized by the weather information recognition unit 805="fair";

the distance to the start position recognized by the distance information recognition unit 806="0 m"; and the pedaling-based vehicle speed calculated by the pedaling-based vehicle speed calculation unit 807="50 km/h".

In this case, for the "speed limit value" equal to "50 km/h", the determination information satisfies the condition for "the traveling hours", the condition for "the distance to the start position", and the condition for "the pedaling-based vehicle speed" among the conditions stored in the "condition". Therefore, "3" is stored in the "display priority".

Also, for the "speed limit value" equal to "60 km/h", the determination information satisfies the condition for "the distance to the start position" among the conditions stored in the "condition". Therefore, "1" is stored in the "display priority.

(3) Situation 3

Suppose that the following determination information is obtained by the determination information obtainment unit 704, for a speed limit value that has been stored in the speed limit value information 1510 in FIG. 15A:

the type of the vehicle recognized by the vehicle type information recognition unit 801="ordinary car";

the type of the road on which the vehicle is traveling recognized by the road type recognition unit 802="road having two lines in each direction" in "suburb";

the lane on which the vehicle is traveling recognized by the driving lane recognition unit 803="lane on the right";

the time information recognized by the time information recognition unit 804="12:50";

the weather around the vehicle recognized by the weather information recognition unit 805="fair";

the distance to the start position recognized by the distance information recognition unit 806="XX m to the town", "0 m to the suburb", and "ZZ in to the expressway"; and the pedaling-based vehicle speed calculated by the pedaling-based vehicle speed calculation unit 807="50 km/h".

In this case, for the "speed limit value" equal to "50 km/h", the determination information satisfies the condition for "the pedaling-based vehicle speed" among the conditions stored in the "condition". Therefore, "1" is stored in the "display priority.

Also, for the "speed limit value" equal to "90 km/h", the determination information satisfies the condition for "the type of the road", and the condition for "the distance to the start position" among the conditions stored in the "condition". Therefore, "2" is stored in the "display priority.

Also, for the "speed limit value" equal to "130 km/h", the determination information satisfies no condition among the conditions stored in the "condition". Therefore, "0" is stored in the "display priority.

Further, for the "speed limit value" equal to "110 km/h", the determination information satisfies no condition among the conditions stored in the "condition". Therefore, "0" is stored in the "display priority.

(4) Situation 4

Suppose that the following determination information is obtained by the determination information obtainment unit 704, for a speed limit value that has been stored in the speed limit value information 1520 in FIG. 153:

the type of the vehicle recognized by the vehicle type information recognition unit 801="ordinary car";

the type of the road on which the vehicle is traveling recognized by the road type recognition unit 802="road having two lines in each direction" in "suburb";

the lane on which the vehicle is traveling recognized by the driving lane recognition unit 803="lane on the right";

the time information recognized by the time information recognition unit 804="8:20";

the weather around the vehicle recognized by the weather information recognition unit 805="fair";

the distance to the start position recognized by the distance information recognition unit 806="0 m"; and the pedaling-based vehicle speed calculated by the pedaling-based vehicle speed calculation unit 807="130 km/h".

In this case, for the "speed limit value" equal to "120 km/h", the determination information satisfies the condition for "the distance to the start position" among the conditions stored in the "condition". Therefore, "1" is stored in the "display priority.

Also, for the "speed limit value" equal to "130 km/h", the determination information satisfies the condition for "the driving lane", the condition for "the distance to the start position", and the condition for "the pedaling-based vehicle speed" among the conditions stored in the "condition". Therefore, "3" is stored in the "display priority.

<13. Details of Process for Displaying Speed Limit Values>

Next, the process for displaying speed limit values (Step S1109 in FIG. 11) will be described in detail using FIG. 16 and FIG. 17. FIG. 16 is a flowchart illustrating a flow of the process for displaying speed limit values in detail. Also, FIG. 17 is a diagram illustrating an example of a screen for selecting a speed limit value that includes an image area designating the speed limit value.

In the following, the process for displaying speed limit values will be described in detail with reference to FIG. 17, following the flowchart in FIG. 16.

At Step S1601, the display control unit 706 displays one of the speed limit values to be selected stored in the speed limit value information 910 (the image area designating the speed limit value) on the screen for selecting a speed limit value. The screen for selecting a speed limit value 1701 in FIG. 17 is an example of the screen for selecting a speed limit value displayed by the display control unit 706 at Step S1601. As illustrated in FIG. 17, the screen for selecting a speed limit value 1701 includes the image area designating a speed limit value.

At Step S1602, the command reception unit 707 determines whether a "Yes" button 1711 on the screen for selecting a speed limit value 1701 has been pressed. If having determined at Step S1602 that the "Yes" button 1711 has been pressed, the process goes forward to Step S1603.

At Step S1603, the command reception unit 707 determines that the speed limit value displayed on the screen for selecting a speed limit value 1701 has been selected when the "Yes" button 1711 was pressed. After that, the process goes back to Step S1110 in FIG. 11. Note that in this case, it is determined at Step S1110 in FIG. 11 that the speed limit value has been selected. Also, at Step S1111 in FIG. 11, the upper speed limit based on the selected speed limit value is set on the co-ECU 140. Therefore, a message is displayed on a screen for selecting a speed limit value 1731 indicating that the upper speed limit based on the speed limit value equal to "100 km/h" has been set.

On the other hand, if having determined at Step S1602 that the "Yes" button 1711 has not been pressed, the process goes forward to Step S1604. At Step S1604, the command reception unit 707 determines whether a "No" button 1712 on the screen for selecting a speed limit value 1701 has been pressed. If having determined at Step S1604 that the "No" button 1712 has been pressed, the process goes forward to S1605.

At Step S1605, the command reception unit 707 determines that the speed limit value displayed on the screen for selecting a speed limit value 1701 has not been selected. After that, the process goes back to Step S1110 in FIG. 11. Note that in this case, it is determined at Step S1110 in FIG. 11 that the speed limit value has not been selected. Therefore, an upper speed limit based on the new speed limit value is not transmitted to the co-ECU 140, and an upper speed limit that has been set already will not change. Therefore, a message is displayed on a screen for selecting a speed limit value 1732 indicating that the upper speed limit remains unchanged.

On the other hand, if having determined at Step S1604 that the "No" button 1712 has not been pressed, the process goes forward to S1606. At Step S1606, the display control unit 706 determines whether a "next candidate" button 1722 has been pressed.

If having determined at Step S1606 that the "next candidate" button 1722 has been pressed, the process goes forward to S1607. At Step S1607, the display control unit 706 displays a speed limit value next to the speed limit value displayed on the screen for selecting a speed limit value 1701, among the speed limit values sorted in descending order of the display priority at Step S1108. After that, the process goes back to Step S1602.

On the other hand, if having determined at Step S1606 that the "next candidate" button 1722 has not been pressed, the process goes forward to S1608. At Step S1608, the display control unit 706 determines whether a "previous candidate" button 1721 has been pressed.

If having determined at Step S1608 that the "previous candidate" button 1721 has been pressed, the process goes forward to S1609. At Step S1609, the display control unit 706 displays a speed limit value previous to the speed limit value displayed on the screen for selecting a speed limit value 1701, among the speed limit values sorted in descending order of the display priority at Step S1108. After that, the process goes back to Step S1602.

<14. Example of Screen Transition of Screen for Selecting a Speed Limit Value>

Next, screen transition of the screen for selecting a speed limit value, with execution of the process for calculating display priority, will be described. Note that before describing the screen transition of the screen for selecting a speed limit value with execution of the process for calculating display priority, a comparative case will be described for screen transition of the screen for selecting a speed limit value, without execution of the process for calculating display priority.

Figure 18C:
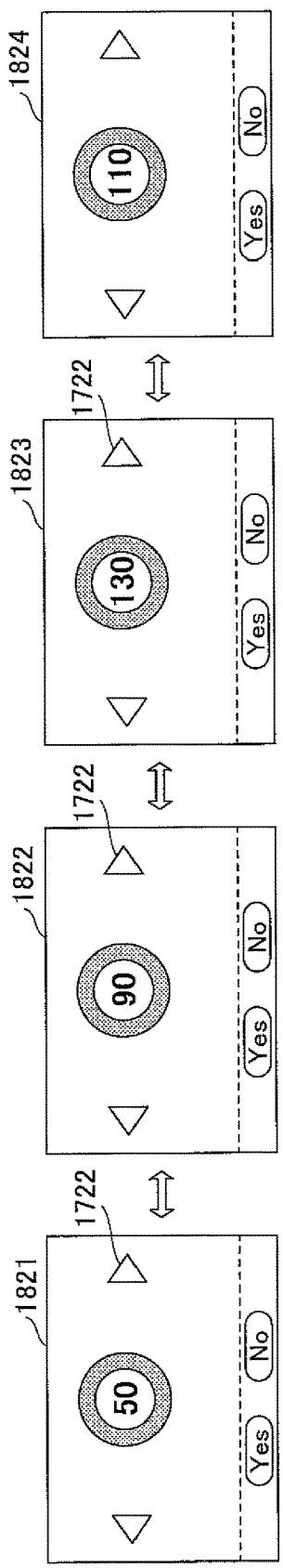
Figure 18D:
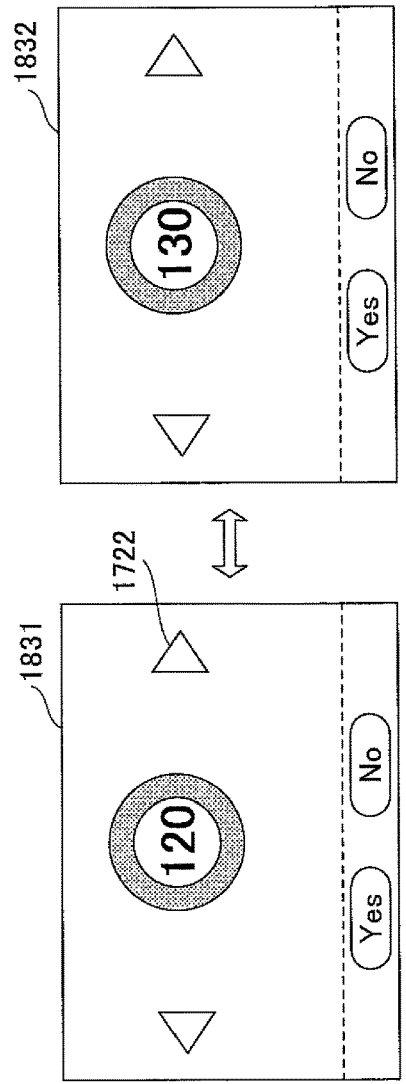

(1) Screen Transition of the Screen for Selecting a Speed Limit Value without Execution of the Process for Calculating Display Priority FIGS. 18A-18D are diagrams illustrating examples of screen transition of screens for selecting a speed limit value without execution of the process for calculating display priority. Among these, FIG. 18A illustrates an example of screen transition of the screen for selecting a speed limit value when corresponding areas on the road sign 320 and the electric bulletin board 330 in FIG. 3 have been identified based on the image information. Also, FIG. 18B illustrates an example of screen transition of the screen for selecting a speed limit value when corresponding areas on the road sign 420 in FIG. 4 has been identified based on the image information. Also, FIG. 18C illustrates an example of screen transition of the screen for selecting a speed limit value when corresponding areas on the road sign 430 in FIG. 4 has been identified based on the image information. Further, FIG. 18D illustrates an example of screen transition of the screen for selecting a speed limit value when corresponding areas on the road marking 440 in FIG. 4 has been identified based on the image information.

The road sign 320 shows the two speed limit displays 321 and 322, and the electric bulletin board 330 shows the single speed limit display 331. Therefore, as illustrated in FIG. 18A, screens for selecting one of speed limit values 1801 to 1803 are displayed in predetermined order on the display unit 131.

Similarly, since the road sign 420 shows the two speed limit displays 421 and 422, as illustrated in FIG. 18B, screens for selecting one of speed limit values 1811 and 1812 are displayed in predetermined order on the display unit 131. Similarly, since the road sign 430 shows the four speed limit displays 431 to 434, as illustrated in FIG. 18C, screens for selecting one of speed limit values 1821 to 1824 are displayed in predetermined order on the display unit 131. Similarly, since the road marking 440 shows the two speed limit displays 441 and 442, as illustrated in FIG. 18D, screens for selecting one of speed limit values 1831 and 1832 are displayed in predetermined order on the display unit 131.

Figure 19A:
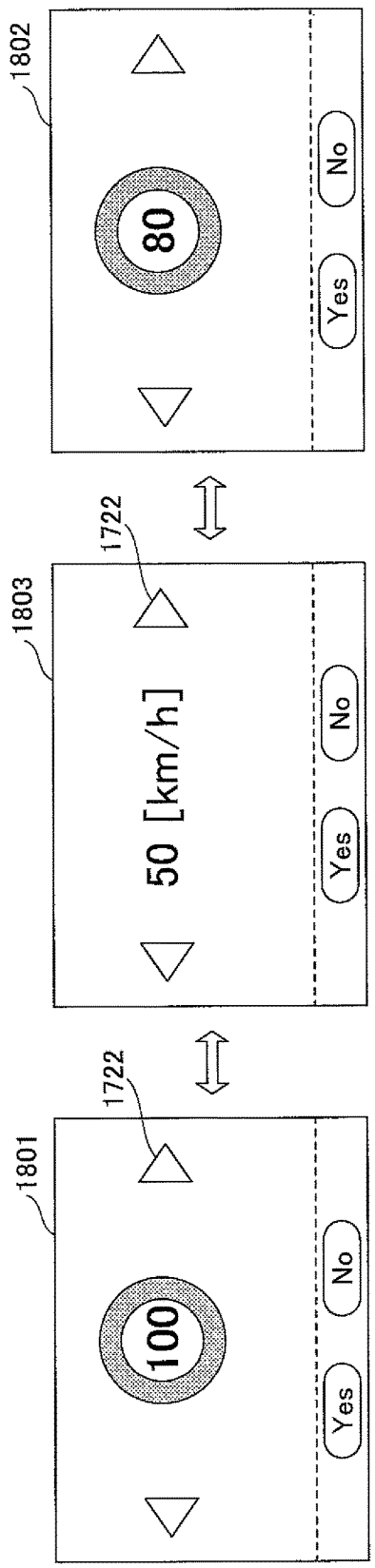
FIGS. 19A-19D are diagrams illustrating examples of screen transition of screens for selecting a speed limit value in a case where a process for calculating display priority is executed.
Figure 19B:
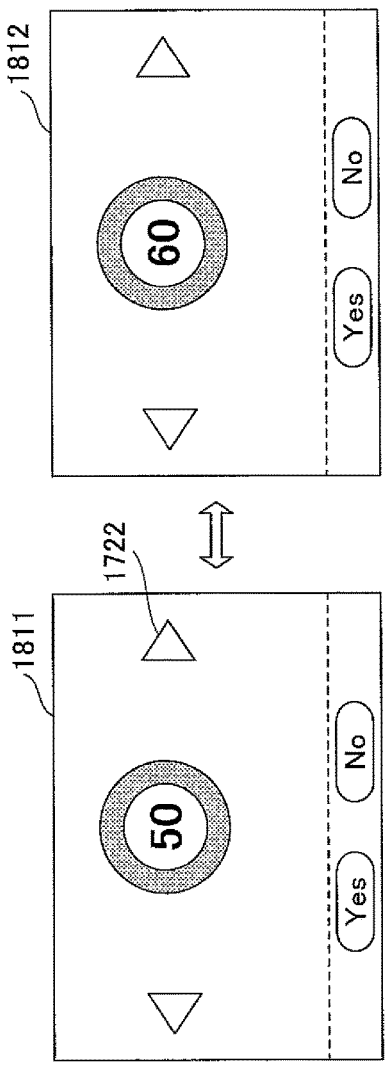
Figure 19C:
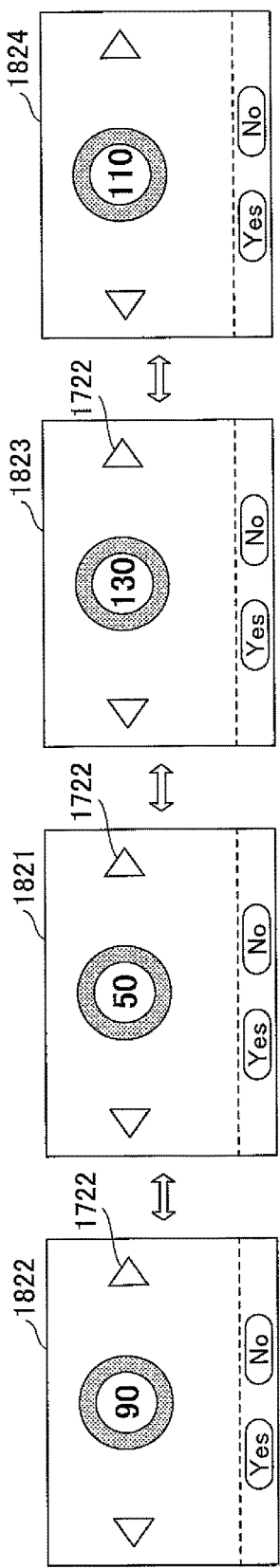
Figure 19D:
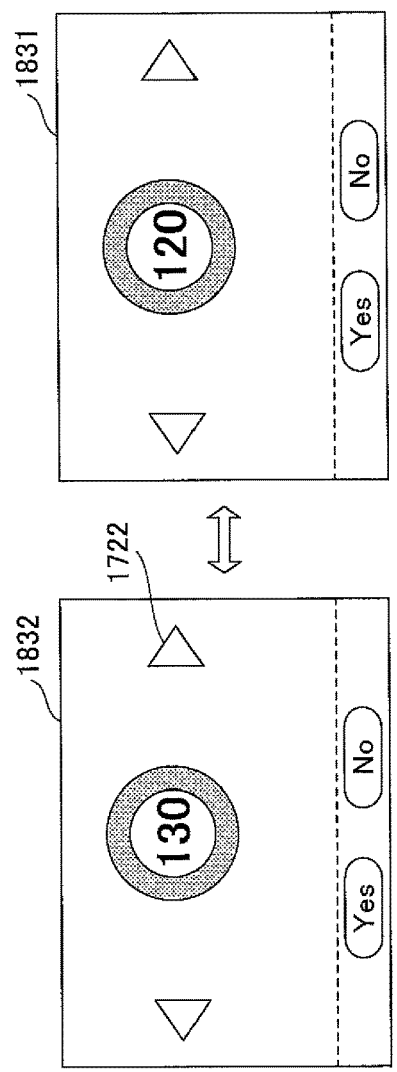
Figure 21A:
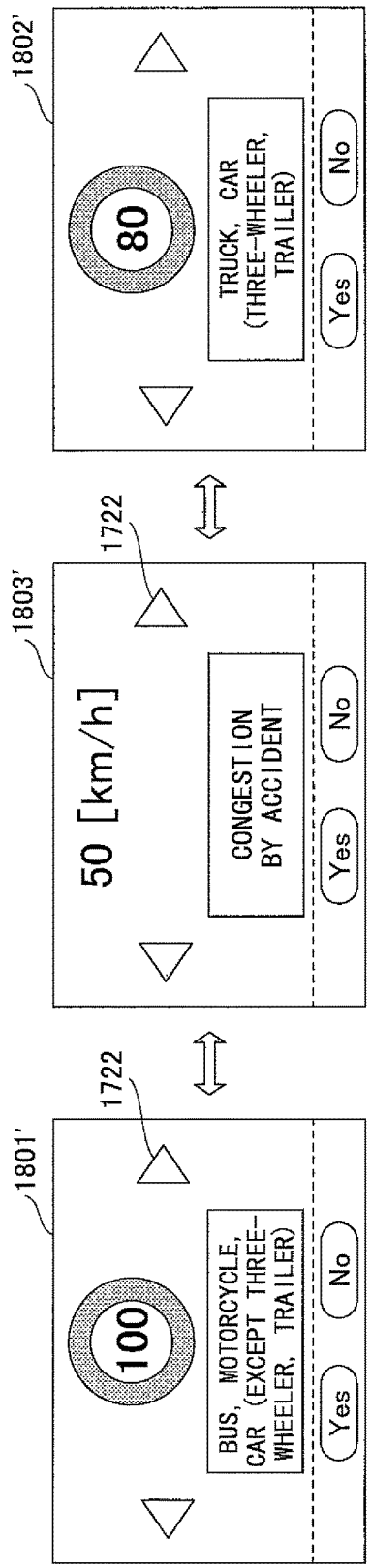
Figure 21B:
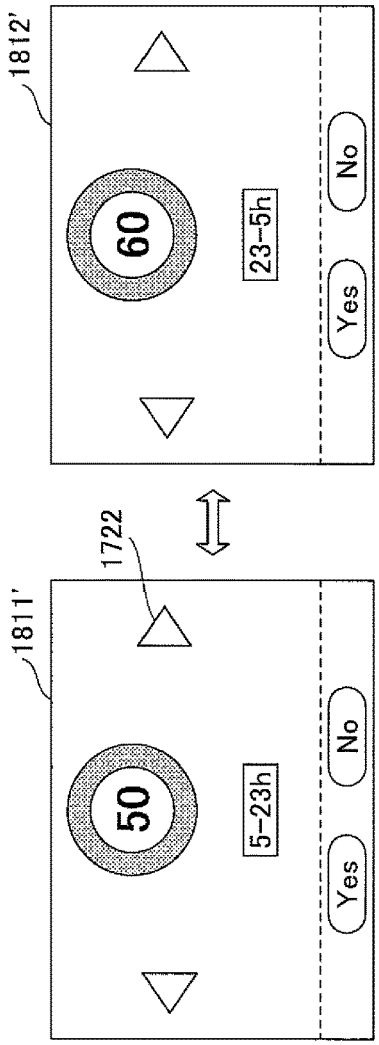

(2) Screen Transition of the Screen for Selecting a Speed Limit Value with Execution of the Process for Calculating Display Priority FIGS. 19A-19D are diagrams illustrating examples of screen transition of screens for selecting a speed limit value with execution of the process for calculating display priority. Among these, FIG. 19A illustrates an example of screen transition of the screen for selecting a speed limit value when corresponding areas on the road sign 320 and the electric bulletin board 330 in FIG. 3 have been identified based on the image information. Also, FIG. 19B illustrates an example of screen transition of the screen for selecting a speed limit value when corresponding areas on the road sign 420 in FIG. 4 has been identified based on the image information. Also, FIG. 19C illustrates an example of screen transition of the screen for selecting a speed limit value when corresponding areas on the road sign 430 in FIG. 4 has been identified based on the image information. Further, FIG. 19D illustrates an example of screen transition of the screen for selecting a speed limit value when corresponding areas on the road marking 440 in FIG. 4 has been identified based on the image information.

Among these, the display order has been changed for FIG. 19A, FIG. 19C, and FIG. 19D with execution of the process for calculating display priority. As the screens for selecting a speed limit value are displayed in descending order of the display priority, the speed limit value equal to "50 km/h" is displayed before the speed limit value equal to "80 km/h" in FIG. 19A. Therefore, if the occupant of the vehicle is to select the speed limit value equal to 80 km/h, the number of times to press the "next candidate" button 1722 can be decreased.

Similarly, as the screens for selecting a speed limit value are displayed in descending order of the display priority, the speed limit value equal to "90 km/h" is displayed first in FIG. 19C. Therefore, if the occupant of the vehicle is to select the speed limit value equal to 90 km/h, there is no need to press the "next candidate" button 1722.

Similarly, as the screens for selecting a speed limit value are displayed in descending order of the display priority, the speed limit value equal to "130 km/h" is displayed first in FIG. 19D. Therefore, if the occupant of the vehicle is to select the speed limit value equal to 130 km/h, there is no need to press the "next candidate" button 1722.

<15. Summary>

As clarified by the above description, the vehicle control system according to the embodiment is configured:

to obtain condition information based on image information, and to analyze the obtained condition information, so that a condition for raising the display priority is derived for each speed limit value;

to obtain determination information for determining whether the condition is satisfied;

to raise the display priority for the speed limit value that corresponds to the condition satisfied with the determination information; and to display the speed limit values to be selected on a display device, in descending order of the display priority.

This make it possible for the occupant of the vehicle to reach a screen for selecting a speed limit value that includes the speed limit value corresponding to the condition satisfied with the determination information, by pressing the "next candidate" button, a decreased number of times.

Consequently, according to the embodiment, the speed limit value corresponding to the condition satisfied with the determination information can be selected with a few operations. In other words, it is possible to provide a vehicle control system that is configured to make it easier for the occupant of the vehicle to select a speed limit value among multiple speed limit values extracted based on image information, for setting the upper speed limit on the vehicle.

Second Embodiment

The first embodiment is configured to display only the speed limit value on a screen for selecting the speed limit value. However, information to be displayed on a screen for selecting the speed limit value is not limited to the speed limit value, but the condition information and the like that correspond to the speed limit value may be displayed.

FIGS. 20A-20D are diagrams illustrating examples of screen transition of screens for selecting a speed limit value. FIGS. 20A-20D illustrate screens for selecting a speed limit value 1801' to 1832' that display condition information and the like, in addition to contents of the screens for selecting a speed limit value 1801 to 1832 illustrated in FIGS. 18A-18D in the first embodiment, respectively.

By displaying the condition information and the like in this way, the occupant of the vehicle can select a speed limit value while viewing the condition information and the like on the display unit 131. Note that in FIGS. 20A-20D, the condition information and the like that can be obtained by extracting image areas in the image information are displayed on the screens for selecting a speed limit value.

Similarly, FIGS. 21A-21D are diagrams illustrating examples of screen transition of screens for selecting a speed limit value. FIGS. 21A-21D illustrate screens for selecting a speed limit value 1801' to 1832' that display condition information and the like, in addition to contents of the screens for selecting a speed limit value 1801 to 1832 illustrated in FIGS. 19A-19D in the first embodiment, respectively.

By displaying the speed limit values in descending order of the display priority along with the condition information and the like in this way, the occupant of the vehicle can select a speed limit value with a few operations while viewing the condition information and the like on the display unit 131.

Other Embodiment

The first and second embodiments are configured to display the image area designating the speed limit value (and the image area designating the condition information and the like) on the screen for selecting the speed limit value. However, the speed limit value (and the condition information and the like) obtained by character recognition applied to the image areas may be displayed on the screen for selecting the speed limit value.

Also, the first and second embodiments are configured to identify an area of a signage based on image information obtained by imaging, and to display a screen for selecting a speed limit value at the moment when a speed limit value is extracted from the identified area of the signage. However, the moment to display the screen for selecting the speed limit value is not limited as such. For example, it may be determined whether the extracted speed limit value has the same content as the content of a speed limit value that has been already extracted, and if the content is the same, the screen for selecting the speed limit value may not be displayed (updated).

Also, the first and second embodiments are configured to indicate a speed limit value based on a selection command by the occupant of the vehicle to the setting unit 708, and to have the setting unit 708 transmits the upper speed limit that corresponds to the speed limit value to be set on the co-ECU 140, at the moment of the indication. However, the moment when the setting unit 708 transmits the upper speed limit that corresponds to the speed limit value is not limited as such. For example, at a moment after the speed limit value has been indicated and the vehicle passes the road sign or the like, the setting unit 708 may transmit the upper speed limit that corresponds to the speed limit value to be set on the co-ECU 140. Alternatively, at a moment when the determination information is determined to satisfy the condition derived from the condition information, the setting unit 708 may transmit the upper speed limit that corresponds to the speed limit value to be set on the co-ECU 140.

Also, the first and second embodiments are configured to determine that a speed limit value has not been selected if the "No" button 1712 has been pressed on a screen for selecting a speed limit value. However, the method for determining that a speed limit value has not been selected is not limited as such. For example, if an operation by the occupant of the vehicle has not been performed after a screen for selecting a speed limit value was displayed until a predetermined time passes, it may be determined that the speed limit value has not been selected.

Also, the first and second embodiments are configured to include one speed limit value on one screen for selecting the speed limit value, but the present invention is not limited as such. For example, one screen for selection may include multiple speed limit values, and one of the speed limit values on the screen may be selected. This is because by having one screen for selecting the speed limit value include multiple speed limit values, the occupant of the vehicle can reduce the number of operations on the next candidate button. Note that for having one screen for selecting the speed limit value include multiple speed limit values, it is assumed that the multiple speed limit values are displayed on the screen for selecting the speed limit value in descending order of the display priority.

Also, the first and second embodiments are configured to use, as the determination information, the type of the vehicle, the type of the road on which the vehicle is traveling, the lane on which the vehicle is traveling, the current time, the weather around the vehicle, the distance to the start position, and the pedaling-based vehicle speed, in the process for calculating display priority.

However, the process for calculating display priority does not need to use all of these determination information items. The process for calculating display priority may be executed with an arbitrary combination of items among these determination information items.

Also, the first and second embodiments are configured to calculate the display priority in the process for calculating display priority in order of the type of the vehicle, the type of the road while traveling, the lane on which the vehicle is traveling, the current time, the weather around the vehicle, the distance to the start position, and the pedaling-based vehicle speed.

However, the order for calculating the display priority in the process for calculating display priority is not limited as such, but any arbitrary order may be adopted to raise the display priority.

Also, the first and second embodiments are configured to raise the display priority in the process for calculating display priority one by one, but the present invention is not limited as such. For example, the display priority may be raised by different amounts between a case where determination information about "the type of the vehicle" satisfies the condition, and a case where determination information about "the type of the road on which the vehicle is traveling" satisfies the condition. Alternatively, the display priority may be raised by different amounts between a case where determination information about "the distance to the start position" satisfies the condition, and a case where determination information about "the pedaling-based vehicle speed" satisfies the condition.

Also, the first and second embodiments are configured to raise the display priority of the speed limit value that corresponds to the condition satisfied with the determination information. However, even if the condition is not completely satisfied with the determination information, but mostly satisfied, the display priority of the speed limit value may be raised by an appropriate amount.

For example, a case will be described in which the vehicle is traveling on a center lane of a road having three lanes in each direction, and the speed limit value is specified for each of the driving lanes. Suppose that if a condition of "the driving lane being the center lane" has been derived, and the lane on which the vehicle is traveling is the center lane, the display priority of the corresponding speed limit value is raised by 1. In this case, for a speed limit value lower among those of the adjacent driving lanes, the display priority may be raised by just 0.8, and for a speed limit value higher among those of the adjacent driving lanes, the display priority may be raised by just 0.5.

Similarly, the first and second embodiments are configured to raise the display priority just by 1 for the speed limit value corresponding to the condition satisfied with the determination information, for example, the distance to the start position calculated by the distance information recognition unit 806 is 0 m. However, the present invention is not limited as such, but the display priority may be raised stepwise, for example, if the distance to the start position is "1 km", the display priority is raised by 0.5, or if the distance to the start position is "2 km", the display priority is raised by 0.2.

Also, a method of limiting the speed by the co-ECU 140 is not specifically mentioned in the first and second embodiments. However, the co-ECU 140 may limit the speed, for example, by driving force limit control that prevents the driving force of the vehicle from exceeding the upper speed limit based on the speed limit value. Also, the driving force limit control function may be configured to be switched on and off for execution in response to input from the user.

It may be assumed that the driving force limit control function is, for example, to calculate the upper limit acceleration for an upper speed limit. Also, the function may calculate the upper limit acceleration, for example, as acceleration with which the vehicle speed will not exceed the upper speed limit, based on the difference between the upper speed limit and the current vehicle speed. Therefore, in principle, a greater value is calculated for the upper limit acceleration, as the difference between the upper speed limit and the current vehicle speed becomes greater.

Also, it may be assumed that the driving force limit control function calculates the upper limit driving force based on the upper limit acceleration. In this case, the upper limit driving force may be calculated taking the road gradient, the traveling resistance, and the like into account. Also, it may be assumed that the driving force limit control function controls the engine so that the required driving force, which is calculated from the stepping amount on the accelerator pedal, is limited to the upper limit driving force, to realize the upper limit driving force if the required driving force is greater than the upper limit driving force. Note that instead of the engine, or in addition to the engine, an electric motor for traveling may be controlled. In this case, feedback control may be applied to the upper limit driving force, based on the difference between the current acceleration and the upper limit acceleration.

Also, the first and second embodiments are configured so that the occupant of the vehicle presses the "Yes" button, the "No" button, or the "next candidate" button on a screen for selecting a speed limit value to input the predetermined command. However, the present invention is not limited as such, but, for example, a lever separated from the display device may be provided, and operated up and down to input the predetermined command.

Note that the present invention is not limited to the configurations described in the embodiments and those combined with the other elements here. These can be changed within the scope of the present invention, and can be appropriately defined depending on usage.

The present application is based on and claims the benefit of priority of Japanese Priority Application No. 2015-205844, filed on Oct. 19, 2015, the entire contents of which are hereby incorporated by reference.

The invention claimed is:

1. A vehicle control system comprising:
an imaging device;
an electronic control unit configured to limit speed of the vehicle and to extract one or more speed limit values, based on image information captured by the imaging device, and to set an upper speed limit; and
a display configured to display the speed limit values extracted by the electronic control unit, wherein when a plurality of speed limit values is extracted, the electronic control unit is configured to:
derive a condition for raising display priority for each of the speed limit values, based on the image information,
obtain determination information for determining whether the condition derived is satisfied,
determine whether the determination information satisfies the condition corresponding to each of the speed limit values,
calculate the display priority for each of the speed limit values, by raising the display priority of the speed limit value that corresponds to the condition determined satisfied with the determination information,
display the speed limit values on the display in descending order of the display priority calculated,
receive selection of one speed limit value among the speed limit values displayed in descending order of the display priority, by an occupant of the vehicle, and
set the upper speed limit based on the one speed limit value received as the selection.

2. The vehicle control system as claimed in claim 1, wherein the electronic control unit displays at least the speed limit values extracted while a predetermined time passes, or the speed limit values extracted while the vehicle travels for a predetermined distance.

3. The vehicle control system as claimed in claim 2, wherein the electronic control unit associates an area among areas included in the image information that includes condition information for deriving the condition, with the speed limit value, and displays the associated area and the speed limit value on the display.

4. The vehicle control system as claimed in claim 1, wherein the electronic control unit associates an area among areas included in the image information that includes condition information for deriving the condition, with the speed limit value, and displays the associated area and the speed limit value on the display.

* * * * *